(12) United States Patent
Ng et al.

(10) Patent No.: US 9,334,343 B2
(45) Date of Patent: May 10, 2016

(54) HYDROHALOGENATION OF VINYL-TERMINATED MACROMONOMERS AND FUNCTIONALIZED DERIVATIVES

(71) Applicant: ExxonMobil Chemical Patents Inc., Baytown, TX (US)

(72) Inventors: Man Kit Ng, Annandale, NJ (US); Donna J Crowther, Seabrook, TX (US); Hong Cheng, Bridgewater, NJ (US); Patrick Brant, Seabrook, TX (US)

(73) Assignee: ExxonMobil Chemical Patents Inc., Baytown, TX (US)

( * ) Notice: Subject to any disclaimer, the term of this patent is extended or adjusted under 35 U.S.C. 154(b) by 374 days.

(21) Appl. No.: 14/033,608

(22) Filed: Sep. 23, 2013

(65) Prior Publication Data

US 2014/0088267 A1 Mar. 27, 2014

Related U.S. Application Data

(60) Provisional application No. 61/704,743, filed on Sep. 24, 2012.

(51) Int. Cl.
*C08F 10/14* (2006.01)
*C08F 10/08* (2006.01)
*C08F 10/10* (2006.01)
*C08F 10/06* (2006.01)
*C08F 8/20* (2006.01)

(52) U.S. Cl.
CPC . *C08F 10/14* (2013.01); *C08F 8/20* (2013.01); *C08F 10/06* (2013.01); *C08F 10/08* (2013.01); *C08F 10/10* (2013.01)

(58) Field of Classification Search
CPC .......... C08F 10/06; C08F 10/08; C08F 10/10; C08F 10/14; C08F 8/20
USPC ...................................... 525/334.1
See application file for complete search history.

(56) References Cited

U.S. PATENT DOCUMENTS

| | | | |
|---|---|---|---|
| 4,110,377 | A | 8/1978 | Clerici et al. |
| 5,616,153 | A | 4/1997 | Mike et al. |
| 6,100,224 | A | 8/2000 | Peiffer et al. |
| 6,111,027 | A | 8/2000 | Wright et al. |
| 6,307,081 | B1 | 10/2001 | Takiuchi et al. |
| 7,183,359 | B2 | 2/2007 | Hanna et al. |
| 8,283,419 | B2 | 10/2012 | Hagadorn et al. |
| 8,372,930 | B2 | 2/2013 | Brant et al. |
| 8,399,725 | B2 | 3/2013 | Brant et al. |
| 2002/0185630 | A1 | 12/2002 | Piccinelli et al. |
| 2009/0318647 | A1 | 12/2009 | Hagadorn et al. |
| 2011/0082259 | A1 | 4/2011 | Kennedy et al. |

FOREIGN PATENT DOCUMENTS

| | | |
|---|---|---|
| JP | 2011-524461 | 9/2011 |
| WO | 2008/066914 | 6/2008 |
| WO | 2009/155472 | 12/2009 |

OTHER PUBLICATIONS

Ummadisetty et al. (Quantitative syntheses of novel polyisobutylenes fitted with terminal primary -Br, -Oh, -NH2, and methacrylate termini; Journal of Polymer Science: Part A: Polymer Chemistry, vol. 46, 4236-4242 (2008)).*

Lu et al. (Synthesis of new amphiphilic diblock copolymers containing poly(ethylene oxide) and poly($\alpha$-olefin); Journal of Polymer Science: Part A: Polymer Chemistry, vol. 40, 3416-3425 (2002)).*

Amin, Smruti B., et al., "Versatile Pathways for In Situ Polyolefin Functionalization with Heteroatoms: Catalytic Chain Transfer", Angew. Chem. Int. Ed., 2008, 47, pp. 2006-2025.

Chung, T.C., "Synthesis of functional polyolefin copolymers with graft and block structures", Prog. Polym. Sci., 27, 2002, pp. 39-85.

Clerici, Mario G., et al., "Catalytic C-Alkylation of Secondary Amines with Alkenes", Synthesis Comm., 1980, 4, pp. 305-306.

Eisenberger, Patrick, et al., "Tantalum-Amidate Complexes for the Hydroaminoalkylation of Secondary Amines: Enhanced Substrate Scope and Enantioselective Chiral Amine Synthesis", Angew. Chem. Int. Ed., 2009, 48, pp. 8361-8365.

Herzon, Seth B., et al., "Hydroaminoalkylation of Unactivated Olefins with Dialkylamines", J. Am. Chem. Soc., 2008, 130, pp. 14940-14941.

Herzon, Seth B., et al., "Direct, Catalytic Hydroaminoalkylation of Unactivated Olefins with N-Alkyl Arylamines", J. Am. Chem. Soc., 2007, 129, pp. 6690-6691.

Kropp, Paul J., et al. "Surface-Mediated Ractions. 1. Hydrohalogenation of Alkenes and Alkynes", J. Am. Chem. Soc., 1990, 112, pp. 7433-7434.

(Continued)

*Primary Examiner* — Ling Choi
*Assistant Examiner* — Chun-Cheng Wang
(74) *Attorney, Agent, or Firm* — Catherine L. Bell

(57) ABSTRACT

This invention relates to a polyolefin composition comprising one or more of the following formulae:

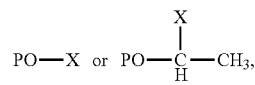

wherein the PO is the residual portion of a vinyl terminated macromonomer (VTM) having had a terminal unsaturated carbon of an allylic chain and a vinyl carbon adjacent to the terminal unsaturated carbon; X is attached to the terminal portion of the VTM to provide PO—X or at the vinylidene carbon of the VTM to provide PO—CHXCH₃; and X is Cl, Br, I, or F.

20 Claims, 1 Drawing Sheet

(56) References Cited

OTHER PUBLICATIONS

Kubiak, Raphael, et al., "Titanium-Catalyzed Hydroaminoalkylation of Alkenes by C—H Bond Activation at sp3 Centers in the α-Position to a Nitrogen Atom", Angew. Chem. Int. Ed., 2009, 48, pp. 1153-1156.

Lopez, Ricardo Godoy, et al., "Synthesis of well-defined polymer architectures by successive catalytic olefin polymerization and living/controlled polymerization reactions", Prog. Polym. Sci., 32, 2007, pp. 419-454.

Roesky, Peter W., "Catalytic Hydroaminoalkylation", Angew. Chem. Int. Ed., 2009, 48, 4892-4894.

Seayad, Abdul Majeed, et al., "Hydroaminomethylation of olefins using a rhodium carbine catalyst", Tetrahedron Letters, 44, 2003, pp. 1679-1683.

Segawa, Yasutomo, "Catalytic Hydroaminoalkylation of Alkenes", Yuki Gosei Kagaku Kyokaishi, 2009, 67(8), pp. 843-844.

Ummadisetty, S., et al. "Quantitative syntheses of novel polyisobutylenes fitted with terminal primary—Br, -Oh, -NH2, and methacrylate termini", Journal of Polymer Science: Part A: Polymer Chemistry, 2008, vol. 46, No. 12, pp. 4236-4242.

\* cited by examiner

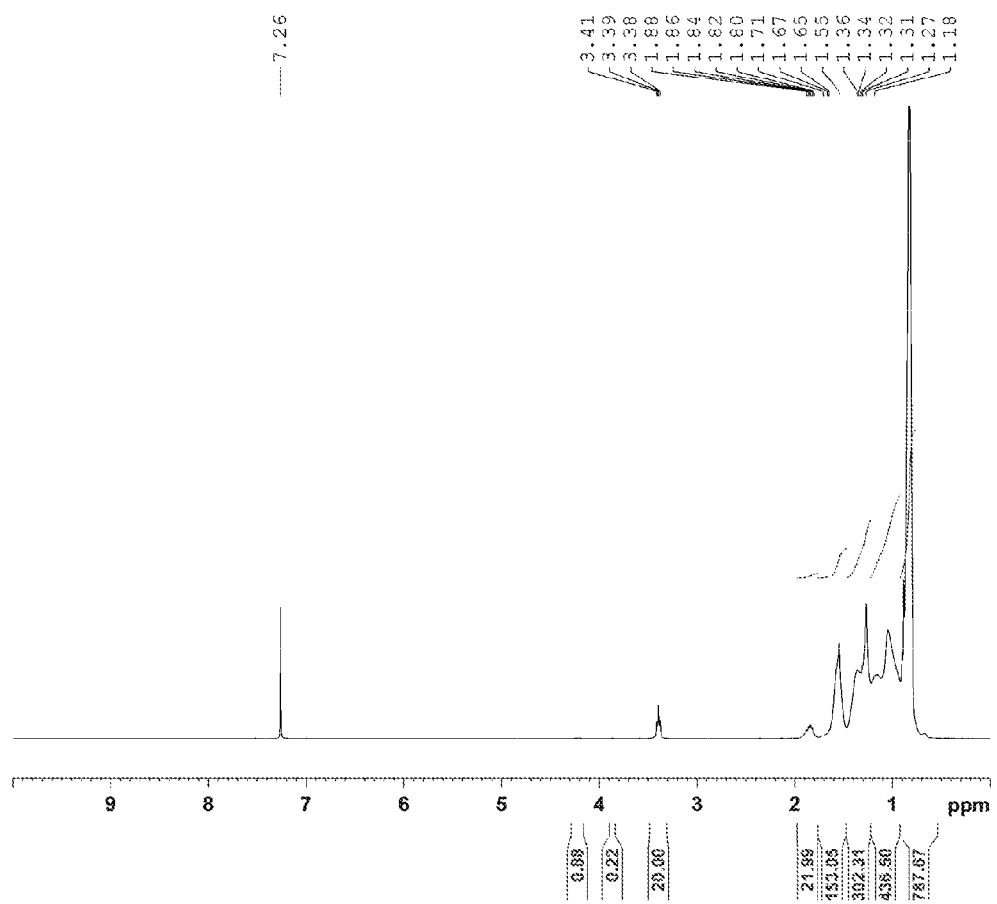

HYDROHALOGENATION OF VINYL-TERMINATED MACROMONOMERS AND FUNCTIONALIZED DERIVATIVES

CROSS-REFERENCE TO RELATED APPLICATION

This application claims priority to and the benefit of U.S. Provisional Application No. 61/704,743, filed Sep. 24, 2012, the disclosure of which is incorporated herein by reference in its entirety.

FIELD OF THE INVENTION

This invention relates to functionalization of vinyl terminated polyolefins by hydrohalogenation.

BACKGROUND OF THE INVENTION

Methods for the production of polyolefins with end-functionalized groups are typically multi-step processes that often create unwanted by-products and waste of reactants and energy. For reviews of methods to form end-functionalized polyolefins, see: (a) S. B. Amin and T. J. Marks, *Angewandte Chemie, International Edition*, 2008, 47, pp. 2006-2025; (b) T. C. Chung *Prog. Polym. Sci.* 2002, 27, pp. 39-85; (c) R. G. Lopez, F. D'Agosto, C. Boisson *Prog. Polym. Sci.* 2007, 32, pp. 419-454. A process with a reduced number of steps, even one step, would be desirable.

U.S. Pat. No. 4,110,377 discloses secondary aliphatic amines alkylated with alpha-olefins, such as ethylene, propylene, hexene, and undecene. Likewise, several literature references disclose hydroaminoalkylation of olefins using various catalysts (see J. Am. Chem. Soc. 2008, 130, pp. 14940-14941; J. Am. Chem. Soc. 2007, 129, pp. 6690-6691; *Angewandte Chemie, International Edition*, 2009, 48, pp. 8361-8365; *Angewandte Chemie, International Edition*, 2009, 48, pp. 4892-4894; *Yuki Gosei Kagaku Kyokaishi* (2009), 67(8), pp. 843-844; *Angewandte Chemie, International Edition* (2009), 48(6), pp. 1153-1156; *Tetrahedron Letters* (2003), 44(8), pp. 1679-1683; *Synthesis* (1980), (4), pp. 305-306). Corey discloses low molecular weight olefins treated with hydrosilanes in the presence of $Cp_2MCl_2$ and n-BuLi to prepare low molecular weight hydrosilylated products.

None of the above references however disclose functionalization of polyolefins, particularly polyolefins having Mn's over 500 g/mol having large amounts of vinyl terminal groups.

U.S. Pat. No. 8,399,725 discloses certain vinyl terminated polymers that are functionalized, optionally, for use in lubricant applications.

U.S. Pat. No. 8,372,930 discloses certain vinyl terminated polymers that are functionalized in U.S. Pat. No. 8,399,725.

U.S. Pat. No. 8,283,419 discloses a process to functionalize propylene homo- or copolymer comprising contacting an alkene metathesis catalyst with a heteroatom containing alkene and a propylene homo- or copolymer having terminal unsaturation.

Additional references of interest include Kropp Paul J. et al *J. Am. Chem. Soc.* 1990, 112, pp. 7433-7434) and Kennedy, J. P. in US 2011/0082259 ("Singly-Terminated Polyisobutylenes and Process for Making Same"), Journal of Polymer Science: Part A: Polymer Chemistry, 2008, 46, pp. 4236-4242 ("Quantitative Syntheses of Novel Polyisobutylenes Fitted with Terminal Primary —Br, —OH, —NH2, and Methacrylate Termini"); U.S. Pat. Nos. 6,111,027; 7,183,359; 6,100,224; and 5,616,153.

Thus, there is a need to develop a means to provide functionalized polyolefins (particularly end-functionalized) by efficient reactions, particularly reactions with good conversion, preferably under mild reaction conditions with a minimal number of steps, preferably one or two steps. The instant invention's use of hydrohalogenation to introduce a halogen functionality is both a commercially economical and an "atom-economical" route to end-functionalized polyolefins.

End-functionalized polyolefins that feature a chemically reactive or polar end group are of interest for use in a broad range of applications as compatibilizers, tie-layer modifiers, surfactants, adhesives, and surface modifiers. Herein is described a novel method for their production by the reaction of vinyl-terminated polyolefins with hydrohalogenated materials. This method is useful for a range of vinyl terminated polyolefins, including isotactic polypropylene (iPP), atactic polypropylene (aPP), ethylene propylene copolymer (EP), polyethylene (PE), and particularly propylene copolymers with larger alpha-olefin comonomers such as butene, hexene, octene, etc. The vinyl terminated polyolefin useful herein can be linear or branched.

SUMMARY OF THE INVENTION

This invention relates to a polyolefin composition comprising one or more of the following formulae:

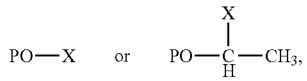

wherein the PO is the residual portion of a vinyl terminated macromonomer (VTM) having had a terminal unsaturated carbon of an allylic chain and a vinyl carbon adjacent to the terminal unsaturated carbon;
X is attached to the terminal portion of the VTM to provide PO—X or at the vinylidene carbon of the VTM to provide PO—CHXCH$_3$; and
X is Cl, Br, I, or F.

Hydrohalogenation of vinyl terminated macromonomers have been shown, inter alia, herein to give the corresponding bromo terminated polyolefin for polypropylene, $C_3C_4$, and $C_3C_6$ copolymers having high vinyl content in the chain end. The bromination method uses simple and inexpensive reagents and affords products in high yield, purity, and regioselectivity. These polyolefin bromides have been further derivitized herein with common nucleophiles such as amines, polyamines, amino alcohols, polyetheramines, polyols, polyalkylene glycol, and hydroxide for introducing heteroatom polar functionalities. The resulting functionalized materials are useful additives and can serve as dispersants, corrosion inhibitors, detergents, surfactants and emulsifier, etc in engine oil, refinery, and oil field chemicals industries.

Efficient and quantitative synthesis of bromine- or other halogen- (chlorine, iodine, or fluorine) terminated polyolefins such as the following:

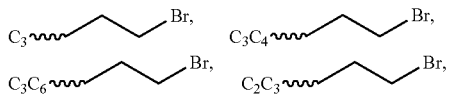

from vinyl-terminated macromonomers (VTMs) as the terminally unsaturated polyolefins. A simple and inexpensive method for functionalizing VTMs with a bromo group in high yield and purity is disclosed. These bromo-terminated macromers can be subsequently used for facile transformation into a diverse range of functional groups and/or more complex polymeric architectures (e.g., block copolymer structures) through (i) substitution reactions, or (ii) formation of organometallic reagents, or (iii) optionally coupling with another polyolefin block. For example, the halogen-terminated polyolefins can be easily functionalized.

Polyolefin bromides are synthesized by hydrobromination of a number of high vinyl content terminated macromonomers ($C_3$, $C_3C_4$, $C_3C_6$) with different backbone composition and molecular weights in high yield, purity, excellent regioselectivity and short reaction time. Addition of the hydrogen bromide (HBr) molecule across the double bond of the vinyl group at the chain end takes place predominantly in the so-called anti-Markovnikov fashion (i.e., the bromine atom is added to the terminal carbon of the vinyl group and the hydrogen to the adjacent internal carbon), resulting in the formation of a primary bromide (—$CH_2$—Br) structure at the chain end of the polyolefin. The bromides formed in this addition reaction may be conveniently called bromo-terminated macromonomers. The versatility and utility of the bromides are further demonstrated by reactions with nucleophiles to afford the corresponding terminally functionalized polyolefin molecules in high yield and purity under mild reaction conditions.

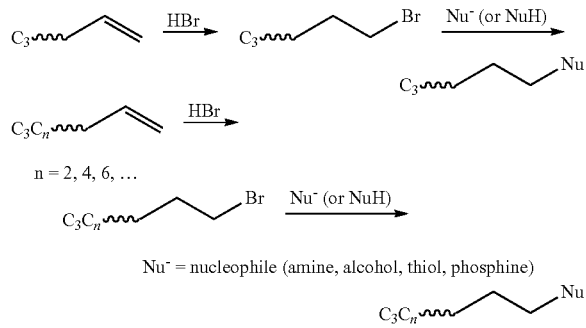

BRIEF DESCRIPTION OF THE FIGURES

FIG. 1 is a $^1$H NMR spectrum of the product 2 from Example 3.

DETAILED DESCRIPTION OF THE INVENTION

The hydrobromination functionalization method as applied to VTMs described herein affords the 1-bromo polyolefin in high regioselectivity, presumably as result of a peroxide effect. The source of the peroxide is believed to be the result of exposure of the VTM materials to open atmosphere leading to the formation of trace amount of peroxide in the material. No additional peroxide radical initiator is needed for the reaction to follow a radical addition mechanism. It is also understood that an ionic mechanism would lead to the 2-bromo polyolefin regioisomer via the intermediacy of a secondary carbocation. In other words, if the 2-bromo regioisomer is the desired product, the VTM materials and hydrogen bromide reagent is preferably purified to eliminate traces of peroxide species.

Common nucleophiles such as hydroxide and alkoxides can be used for illustration and other nucleophiles may also be used for introducing heteroatom polar functionalities. A non-exhaustive list of carbon, nitrogen, oxygen, phosphorus, and sulfur nucleophiles are provided below.

Examples of carbon nucleophiles bearing acidic hydrogen(s) include but are not limited to dialkyl malonate, cyano ester, malononitrile, 1,3-diketone, cyanide, the alpha-carbanion of ketone, aldehydes, esters, nitriles, anions of terminal alkynes, phosphonate, phosphonium salts, sulfoxide anions, sulfone anions, cyclopentadienyl anions, indenyl anions, fluorenyl anions, alkyl metals, vinyl metals, aryl metals, heteroaryl metal reagents derived from Grignard reagents, organolithium reagents, organozinc reagents or organocuprate reagents, and the like.

Examples of nitrogen nucleophiles include, but are not limited to, pyridine, quinoline, pyrrole, or imidazole.

Examples of oxygen nucleophiles include, but are not limited to, water, hydroxide anion, alkoxide anions, phenoxide anions, naphthoxide anions, carboxylate anion (acetate, propanoate, benzoate, acrylate, methacrylate), or hydrogen peroxide.

Examples of phosphorus nucleophiles include, but are not limited to, trialkyl phosphite, triaryl phosphite, trialkyl phosphine, triaryl phosphine, dialkyl phosphine, and diaryl phosphine.

Examples of sulfur nucleophiles include, but are not limited to, hydrogen sulfide and its salts, alkyl monothiols and thiolate anions, aromatic monothiol, thiourea, thiol carboxylic acid (e.g., thioacetic acid salt, RC(=O)—S$^-$), xanthate anion (dithiocarbonate, RO—C(=S)—S$^-$, e.g., from alcohol, KOH and carbon disulfide), or dithiocarbamate anion $R_2$N—C(=S)—S$^-$.

In addition to participating in nucleophilic substitution reaction where the bromide is acting as a good leaving group, the bromine group on the polyolefin can be used for the formation of organometallic reagents through transmetallation (e.g., lithiation with n-butyllithium or sec-butyllithium or tert-butyllithium), oxidative addition with metal (e.g., zinc, magnesium and other activated metal). The newly formed polyolefin organometallic reagent will be turned into a strong nucleophile for undergoing (i) nucleophilic addition to electrophiles (e.g., aldehyde, ketone, ester, thioester, anhydride, nitrile, epoxide, acetal, organic halide, etc.); (ii) transition metal catalyzed cross-coupling with alkyl, vinyl, aryl, heteroaryl halides; and (iii) cross-coupling with another polymer block bearing any of the said functional group(s) mentioned above to form a diblock or multi-block copolymer structures. Examples of chain-end functionalized polymer includes bromo terminated polystyrene or polyolefin derived from VTMs (polypropylene, EP, propylene/alpha olefin copolymer, polyalphaolefin, etc).

DEFINITIONS

In the structures depicted throughout this specification and the claims, a solid line indicates a bond, and an arrow indicates that the bond may be dative.

As used herein, the new notation for the Periodic Table Groups is used as described in *Chemical and Engineering News,* 63(5), p. 27 (1985).

The term "substituted" means that a hydrogen group has been replaced with a hydrocarbyl group, a heteroatom, or a heteroatom containing group. For example, methyl cyclopentadiene (Cp) is a Cp group substituted with a methyl group and ethyl alcohol is an ethyl group substituted with an —OH group.

The terms "hydrocarbyl radical," "hydrocarbyl," and "hydrocarbyl group" are used interchangeably throughout this document. Likewise, the terms "functional group," "group," and "substituent" are also used interchangeably in this document. For purposes of this disclosure, "hydrocarbyl radical" is defined to be $C_1$ to $C_{20}$ radicals, that may be linear, branched, or cyclic (aromatic or non-aromatic); and may include substituted hydrocarbyl radicals as defined herein. In an embodiment, a functional group may comprise a hydrocarbyl radical, a substituted hydrocarbyl radical, or a combination thereof.

Substituted hydrocarbyl radicals are radicals in which at least one hydrogen atom has been substituted with a heteroatom or heteroatom containing group, or with atoms from Groups 13, 14, 15, 16, and 17 of the Periodic Table of Elements, or a combination thereof, or with at least one functional group, such as halogen (Cl, Br, I, F), $NR*_2$, $OR*$, $SeR*$, $TeR*$, $PR*_2$, $AsR*_2$, $SbR*_2$, $SR*$, $BR*_2$, $SiR*_3$, $GeR*_3$, $SnR*_3$, $PbR*_3$, and the like or where at least one heteroatom has been inserted within the hydrocarbyl radical, such as halogen (Cl, Br, I, F), O, S, Se, Te, $NR*$, $PR*$, $AsR*$, $SbR*$, $BR*$, $SiR*_2$, $GeR*_2$, $SnR*_2$, $PbR*_2$, and the like, where $R*$ is, independently, hydrogen or a hydrocarbyl radical, or any combination thereof.

In an embodiment, the hydrocarbyl radical is independently selected from methyl, ethyl, ethenyl, and isomers of propyl, butyl, pentyl, hexyl, heptyl, octyl, nonyl, decyl, undecyl, dodecyl, tridecyl, tetradecyl, pentadecyl, hexadecyl, heptadecyl, octadecyl, nonadecyl, eicosyl, heneicosyl, docosyl, tricosyl, tetracosyl, pentacosyl, hexacosyl, heptacosyl, octacosyl, nonacosyl, triacontyl, propenyl, butenyl, pentenyl, hexenyl, heptenyl, octenyl, nonenyl, decenyl, undecenyl, dodecenyl, tridecenyl, tetradecenyl, pentadecenyl, hexadecenyl, heptadecenyl, octadecenyl, nonadecenyl, eicosenyl, heneicosenyl, docosenyl, tricosenyl, tetracosenyl, pentacosenyl, hexacosenyl, heptacosenyl, octacosenyl, nonacosenyl, triacontenyl, propynyl, butynyl, pentynyl, hexynyl, heptynyl, octynyl, nonynyl, decynyl, undecynyl, dodecynyl, tridecynyl, tetradecynyl, pentadecynyl, hexadecynyl, heptadecynyl, octadecynyl, nonadecynyl, eicosynyl, heneicosynyl, docosynyl, tricosynyl, tetracosynyl, pentacosynyl, hexacosynyl, heptacosynyl, octacosynyl, nonacosynyl, and triacontynyl. Also included are isomers of saturated, partially unsaturated, and aromatic cyclic structures wherein the radical may additionally be subjected to the types of substitutions described above. Examples include phenyl, methylphenyl, benzyl, methylbenzyl, naphthyl, cyclohexyl, cyclohexenyl, methylcyclohexyl, and the like. For this disclosure, when a radical is listed, it indicates that radical type and all other radicals formed when that radical type is subjected to the substitutions defined above. Alkyl, alkenyl, and alkynyl radicals listed include all isomers including, where appropriate, cyclic isomers, for example, butyl includes n-butyl, 2-methylpropyl, 1-methylpropyl, tert-butyl, and cyclobutyl (and analogous substituted cyclopropyls); pentyl includes n-pentyl, cyclopentyl, 1-methylbutyl, 2-methylbutyl, 3-methylbutyl, 1-ethylpropyl, and neopentyl (analogous substituted cyclobutyls and cyclopropyls); and butenyl includes E and Z forms of 1-butenyl, 2-butenyl, 3-butenyl, 1-methyl-1-propenyl, 1-methyl-2-propenyl, 2-methyl-1-propenyl, and 2-methyl-2-propenyl (cyclobutenyls and cyclopropenyls). Cyclic compounds having substitutions include all isomer forms, for example, methylphenyl would include ortho-methylphenyl, meta-methylphenyl, and para-methylphenyl; dimethylphenyl would include 2,3-dimethylphenyl, 2,4-dimethylphenyl, 2,5-dimethylphenyl, 2,6-diphenylmethyl, 3,4-dimethylphenyl, and 3,5-dimethylphenyl.

An "olefin," alternatively referred to as "alkene," is a linear, branched, or cyclic compound of carbon and hydrogen having at least one double bond. For purposes of this specification and the claims appended thereto, when a polymer or copolymer is referred to as comprising an olefin, including, but not limited to, ethylene, propylene, and butene, the olefin present in such polymer or copolymer is the polymerized form of the olefin. For example, when a copolymer is said to have an "ethylene" content of 35 wt % to 55 wt %, it is understood that the mer unit in the copolymer is derived from ethylene in the polymerization reaction and said derived units are present at 35 wt % to 55 wt %, based upon the weight of the copolymer. A "polymer" has two or more of the same or different mer units. A "homopolymer" is a polymer having mer units that are the same. A "copolymer" is a polymer having two or more mer units that are different from each other. A "terpolymer" is a polymer having three mer units that are different from each other. "Different" as used to refer to mer units indicates that the mer units differ from each other by at least one atom or are different isomerically. Accordingly, the definition of copolymer, as used herein, includes terpolymers and the like. An oligomer is a polymer having a low molecular weight. In some embodiments, an oligomer has an Mn of 21,000 g/mol or less (e.g., 2,500 g/mol or less); in other embodiments, an oligomer has a low number of mer units (such as 75 mer units or less).

An "alpha-olefin" is an olefin having a double bond at the alpha (or 1-) position. A "linear alpha-olefin" or "LAO" is an olefin with a double bond at the alpha position and a linear hydrocarbon chain. A "polyalphaolefin" or "PAO" is a polymer having two or more alpha-olefin units. For the purposes of this disclosure, the term "α-olefin" includes $C_2$-$C_{20}$ olefins. Non-limiting examples of α-olefins include ethylene, propylene, 1-butene, 1-pentene, 1-hexene, 1-heptene, 1-octene, 1-nonene, 1-decene, 1-undecene 1-dodecene, 1-tridecene, 1-tetradecene, 1-pentadecene, 1-hexadecene, 1-heptadecene, 1-octadecene, 1-nonadecene, 1-eicosene, 1-heneicosene, 1-docosene, 1-tricosene, 1-tetracosene, 1-pentacosene, 1-hexacosene, 1-heptacosene, 1-octacosene, 1-nonacosene, 1-triacontene, 4-methyl-1-pentene, 3-methyl-1-pentene, 5-methyl-1-nonene, 3,5,5-trimethyl-1-hexene, vinylcyclohexane, and vinylnorbornane. Non-limiting examples of cyclic olefins and diolefins include cyclopropene, cyclobutene, cyclopentene, cyclohexene, cycloheptene, cyclooctene, cyclononene, cyclodecene, norbornene, 4-methylnorbornene, 2-methylcyclopentene, 4-methylcyclopentene, vinylcyclohexane, norbornadiene, dicyclopentadiene, 5-ethylidene-2-norbornene, vinylcyclohexene, 5-vinyl-2-norbornene, 1,3-divinylcyclopentane, 1,2-divinylcyclohexane, 1,3-divinylcyclohexane, 1,4-divinylcyclohexane, 1,5-divinylcyclooctane, 1-allyl-4-vinylcyclohexane, 1,4-diallylcyclohexane, 1-allyl-5-vinylcyclooctane, and 1,5-diallylcyclooctane.

For purposes herein, a polymer or polymeric chain comprises a concatenation of carbon atoms bonded to each other in a linear or a branched chain, which is referred to herein as the backbone of the polymer (e.g., polyethylene). The polymeric chain may further comprise various pendent groups attached to the polymer backbone which were present on the monomers from which the polymer was produced. These pendent groups are not to be confused with branching of the polymer backbone, the difference between pendent side chains and both short and long chain branching being readily understood by one of skill in the art.

The terms "catalyst" and "catalyst compound" are defined to mean a compound capable of initiating catalysis. In the description herein, the catalyst may be described as a catalyst precursor, a pre-catalyst compound, or a transition metal compound (for example, a metallocene compound), and these terms are used interchangeably. A catalyst compound may be used by itself to initiate catalysis or may be used in combination with an activator to initiate catalysis. When the catalyst compound is combined with an activator to initiate catalysis, the catalyst compound is often referred to as a pre-catalyst or catalyst precursor. A "catalyst system" is a combination of at least one catalyst compound, an optional activator, an optional co-activator, and an optional support material, where the system can polymerize monomers to polymer. For the purposes of this invention and the claims thereto, when catalyst systems are described as comprising neutral stable forms of the components, it is well understood by one of ordinary skill in the art, that the ionic form of the component is the form that reacts with the monomers to produce polymers.

An "anionic ligand" is a negatively charged ligand which donates one or more pairs of electrons to a metal ion. A "neutral donor ligand" is a neutrally charged ligand which donates one or more pairs of electrons to a metal ion.

A "scavenger" is a compound that is typically added to facilitate polymerization by scavenging impurities. Some scavengers may also act as activators and may be referred to as co-activators. A co-activator, that is not a scavenger, may also be used in conjunction with an activator in order to form an active catalyst. In some embodiments, a co-activator can be pre-mixed with the catalyst compound to form an alkylated catalyst compound, also referred to as an alkylated invention compound.

A propylene polymer is a polymer having at least 50 mol % of propylene. As used herein, Mn is number average molecular weight as determined by proton nuclear magnetic resonance spectroscopy ($^1$H NMR) where the data is collected at 120° C. in a 5 mm probe using a spectrometer with a $^1$H frequency of at least 400 MHz. Data is recorded using a maximum pulse width of 45°, 8 seconds between pulses and signal averaging 120 transients. Unless stated otherwise, Mw is weight average molecular weight as determined by gel permeation chromatography (GPC), Mz is z average molecular weight as determined by GPC as described in the VINYL TERMINATED MACROMONOMERS section below, wt % is weight percent, and mol % is mole percent. Molecular weight distribution (MWD) is defined to be Mw (GPC) divided by Mn (GPC). Unless otherwise noted, all molecular weight units, e.g., Mw, Mn, Mz, are g/mol.

The following abbreviations may be used through this specification: Me is methyl, Ph is phenyl, Et is ethyl, Pr is propyl, iPr is isopropyl, n-Pr is normal propyl, Bu is butyl, iBu is isobutyl, tBu is tertiary butyl, p-tBu is para-tertiary butyl, nBu is normal butyl, TMS is trimethylsilyl, TIBAL is tri-isobutylaluminum, TNOAL is triisobutyl n-octylaluminum, MAO is methylalumoxane, pMe is para-methyl, Ar* is 2,6-diisopropylaryl, Bz is benzyl, THF is tetrahydrofuran.

In one aspect, this invention relates to a polyolefin composition comprising one or more of the following formulae:

wherein the PO is the residual portion of a vinyl terminated macromonomer (VTM) having had a terminal unsaturated carbon of an allylic chain and a vinyl carbon adjacent to the terminal unsaturated carbon;

X is attached to the terminal portion of the VTM to provide PO—X or at the vinylidene carbon of the VTM to provide PO—CHXCH$_3$; and X is Cl, Br, I, or F.

In another embodiment this invention relates to a polyolefin composition comprising one or more of the following formulae:

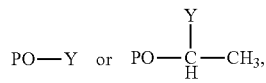

wherein the PO is the residual portion of a vinyl terminated macromonomer (VTM, preferably any of those described herein) having had a terminal unsaturated carbon of an allylic chain and a vinyl carbon adjacent to the terminal unsaturated carbon;

Y is a hydroxyl, an ether group, a cyano, a C$_1$-C$_{20}$ alkyl group, a cyclopentadienyl, an aromatic group, or a phthalimide group. In a preferred embodiment, the ether group comprises the formula:

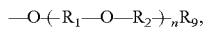

wherein R$_1$ is an alkyl or an aryl; R$_2$ is a bond, an alkyl or an aryl; R$_9$ is an alkyl or an aryl;

and n is from 1 to about 500, preferably the ether group comprises the formula:

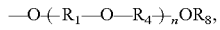

wherein each R$_1$ and R$_4$ is, independently, an alkyl or an aryl; R$_8$ is an alkyl or an aryl; and n is from 1 to about 500.

In another embodiment, this invention relates to a method to functionalize a vinyl terminated macromonomer (VTM as described herein) comprising the step: contacting a VTM with a compound having the formula HX, wherein X is Cl, I, Br, or F to provide an X functionalized VTM. In a preferred embodiment, the method further comprising the step of contacting the X functionalized VTM with a hydroxyl, an alkoxide, an aryl anion, a carbanion, a cyano or a phthalimide group. In a preferred embodiment, the alcohol group for the alkoxide comprises the formula:

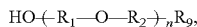

wherein R$_1$ is an alkyl or an aryl; R$_2$ is a bond, an alkyl or an aryl; R$_9$ is an alkyl or an aryl; and n is from 1 to about 500, preferably the alcohol group for the alkoxide comprises the formula:

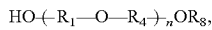

wherein each R$_1$ and R$_4$ is, independently, an alkyl or an aryl; R$_8$ is, an alkyl or an aryl; and is from 1 to about 500.

In a preferred embodiment, the method described above provides a 90% yield.

In a preferred embodiment, the $M_w/M_n$ of the VTM and/or X functionalized VTM is from 2 to 4, preferably from 1.1 to 1.02.

Vinyl Terminated Macromonomers

A "vinyl terminated macromonomer," (also referred to as a "vinyl terminated polyolefin") as used herein, refers to one or more of:

(i) a vinyl terminated polymer having at least 5% allyl chain ends (preferably 15%, 20%, 30%, 40%, 50%, 60%, 70%, 80%, 90%, 95%, 98%, or 99%);

(ii) a vinyl terminated polymer having an Mn of at least 160 g/mol, preferably at least 200 g/mol (measured by $^1H$ NMR) comprising of one or more $C_4$ to $C_{40}$ higher olefin derived units, where the higher olefin polymer comprises substantially no propylene derived units; and wherein the higher olefin polymer has at least 5% allyl chain ends;

(iii) a copolymer having an Mn of 300 g/mol or more (measured by $^1H$ NMR) comprising (a) from about 20 mol % to about 99.9 mol % of at least one $C_5$ to $C_{40}$ higher olefin, and (b) from about 0.1 mol % to about 80 mol % of propylene, wherein the higher olefin copolymer has at least 40% allyl chain ends;

(iv) a copolymer having an Mn of 300 g/mol or more (measured by $^1H$ NMR), and comprises (a) from about 80 mol % to about 99.9 mol % of at least one $C_4$ olefin, (b) from about 0.1 mol % to about 20 mol % of propylene; and wherein the vinyl terminated macromonomer has at least 40% allyl chain ends relative to total unsaturation;

(v) a co-oligomer having an Mn of 300 g/mol to 30,000 g/mol (measured by $^1H$ NMR) comprising 10 mol % to 90 mol % propylene and 10 mol % to 90 mol % of ethylene, wherein the oligomer has at least X % allyl chain ends (relative to total unsaturations), where: 1) X=(−0.94*(mol % ethylene incorporated)+100), when 10 mol % to 60 mol % ethylene is present in the co-oligomer, 2) X=45, when greater than 60 mol % and less than 70 mol % ethylene is present in the co-oligomer, and 3) X=(1.83*(mol % ethylene incorporated)−83), when 70 mol % to 90 mol % ethylene is present in the co-oligomer;

(vi) a propylene oligomer, comprising more than 90 mol % propylene and less than 10 mol % ethylene wherein the oligomer has: at least 93% allyl chain ends, a number average molecular weight (Mn) of about 500 g/mol to about 20,000 g/mol, an isobutyl chain end to allylic vinyl group ratio of 0.8:1 to 1.35:1.0, less than 100 ppm aluminum, and/or less than 250 regio defects per 10,000 monomer units;

(vii) a propylene oligomer, comprising: at least 50 mol % propylene and from 10 mol % to 50 mol % ethylene, wherein the oligomer has: at least 90% allyl chain ends, an Mn of about 150 g/mol to about 20,000 g/mol, preferably 10,000 g/mol, and an isobutyl chain end to allylic vinyl group ratio of 0.8:1 to 1.2:1.0, wherein monomers having four or more carbon atoms are present at from 0 mol % to 3 mol %;

(viii) a propylene oligomer, comprising: at least 50 mol % propylene, from 0.1 mol % to 45 mol % ethylene, and from 0.1 mol % to 5 mol % $C_4$ to $C_{12}$ olefin, wherein the oligomer has: at least 90% allyl chain ends, an Mn of about 150 g/mol to about 10,000 g/mol, and an isobutyl chain end to allylic vinyl group ratio of 0.8:1 to 1.35:1.0;

(ix) a propylene oligomer, comprising: at least 50 mol % propylene, from 0.1 mol % to 45 mol % ethylene, and from 0.1 mol % to 5 mol % diene, wherein the oligomer has: at least 90% allyl chain ends, an Mn of about 150 g/mol to about 10,000 g/mol, and an isobutyl chain end to allylic vinyl group ratio of 0.7:1 to 1.35:1.0;

(x) a homo-oligomer, comprising propylene, wherein the oligomer has: at least 93% allyl chain ends, an Mn of about 500 g/mol to about 70,000 g/mol, alternately to about 20,000 g/mol, an isobutyl chain end to allylic vinyl group ratio of 0.8:1 to 1.2:1.0, and less than 1400 ppm aluminum;

(xi) vinyl terminated polyethylene having: (a) at least 60% allyl chain ends; (b) a molecular weight distribution of less than or equal to 4.0; (c) a g'(vis) of greater than 0.95; and (d) an Mn ($^1H$ NMR) of at least 20,000 g/mol; and (xii) vinyl terminated polyethylene having: (a) at least 50% allyl chain ends; (b) a molecular weight distribution of less than or equal to 4.0; (c) a g'(vis) of 0.95 or less; (d) an Mn ($^1H$ NMR) of at least 7,000 g/mol; and (e) a Mn (GPC)/Mn ($^1H$ NMR) in the range of from about 0.8 to about 1.2.

It is understood by those of ordinary skill in the art that when the VTM's, as described here, are reacted with another material the "vinyl" (e.g. the allyl chain end) is involved in the reaction and has been transformed. Thus, the language used herein describing that a fragment of the final product (typically referred to as PO in the formulae herein) is the residual portion of a vinyl terminated macromonomer (VTM) having had a terminal unsaturated carbon of an allylic chain and a vinyl carbon adjacent to the terminal unsaturated carbon, is meant to refer to the fact that the VTM has been incorporated in the product. Similarly stating that a product or material comprises a VTM means that the reacted form of the VTM is present, unless the context clearly indicates otherwise (such as a mixture of ingredients that do not have a catalytic agent present.)

In some embodiments, the vinyl terminated macromonomer has an Mn of at least 200 g/mol, (e.g., 200 g/mol to 100,000 g/mol, e.g., 200 g/mol to 75,000 g/mol, e.g., 200 g/mol to 60,000 g/mol, e.g., 300 g/mol to 60,000 g/mol, or e.g., 750 g/mol to 30,000 g/mol) (measured by $^1H$ NMR) and comprises one or more (e.g., two or more, three or more, four or more, and the like) $C_4$ to $C_{40}$ (e.g., $C_4$ to $C_{30}$, $C_4$ to $C_{20}$, or $C_4$ to $C_{12}$, e.g., butene, pentene, hexene, heptene, octene, nonene, decene, undecene, dodecene, norbornene, norbornadiene, dicyclopentadiene, cyclopentene, cycloheptene, cyclooctene, cyclooctadiene, cyclododecene, 7-oxanorbornene, 7-oxanorbornadiene, substituted derivatives thereof, and isomers thereof) olefin derived units, where the vinyl terminated macromonomer comprises substantially no propylene derived units (e.g., less than 0.1 wt % propylene, e.g., 0 wt %); and wherein the vinyl terminated macromonomer has at least 5% (at least 10%, at least 15%, at least 20%, at least 30%, at least 40%, at least 50%, at least 60%, at least 70%; at least 80%, at least 90%, or at least 95%) allyl chain ends (relative to total unsaturation); and optionally, an allyl chain end to vinylidene chain end ratio of 1:1 or greater (e.g., greater than 2:1, greater than 2.5:1, greater than 3:1, greater than 5:1, or greater than 10:1); and even further optionally, e.g., substantially no isobutyl chain ends (e.g., less than 0.1 wt % isobutyl chain ends). In some embodiments, the vinyl terminated macromonomers may also comprise ethylene derived units, e.g., at least 5 mol % ethylene (e.g., at least 15 mol % ethylene, e.g., at least 25 mol % ethylene, e.g., at least 35 mol % ethylene, e.g., at least 45 mol % ethylene, e.g., at least 60 mol % ethylene, e.g., at least 75 mol % ethylene, or e.g., at least 90 mol % ethylene). Such vinyl terminated macromonomers are further described in U.S. Pat. No. 8,426,659, which is hereby incorporated by reference.

In some embodiments, the vinyl terminated macromonomers may have an Mn (measured by $^1H$ NMR) of greater than 200 g/mol (e.g., 300 g/mol to 60,000 g/mol, 400 g/mol to 50,000 g/mol, 500 g/mol to 35,000 g/mol, 300 g/mol to 15,000 g/mol, 400 g/mol to 12,000 g/mol, or 750 g/mol to 10,000 g/mol), and comprise:

(a) from about 20 mol % to 99.9 mol % (e.g., from about 25 mol % to about 90 mol %, from about 30 mol % to about 85 mol %, from about 35 mol % to about 80 mol %, from about 40 mol % to about 75 mol %, or from about 50 mol % to about 95 mol %) of at least one $C_5$ to $C_{40}$ (e.g., $C_6$ to $C_{20}$) higher olefin; and (b) from about 0.1 mol % to 80 mol % (e.g., from about 5 mol % to 70 mol %, from about 10 mol % to about 65 mol %, from about 15 mol % to about 55 mol %, from about 25 mol % to about 50 mol %, or from about 30 mol % to about 80 mol %) of propylene;

wherein the vinyl terminated macromonomer has at least 40% allyl chain ends (e.g., at least 50% allyl chain ends, at least 60% allyl chain ends, at least 70% allyl chain ends, or at least 80% allyl chain ends, at least 90% allyl chain ends, at least 95% allyl chain ends) relative to total unsaturation; and, optionally, an isobutyl chain end to allyl chain end ratio of less than 0.70:1, less than 0.65:1, less than 0.60:1, less than 0.50:1, or less than 0.25:1; and further optionally, an allyl chain end to vinylidene chain end ratio of greater than 2:1 (e.g., greater than 2.5:1, greater than 3:1, greater than 5:1, or greater than 10:1); and even further optionally, an allyl chain end to vinylene ratio is greater than 1:1 (e.g., greater than 2:1 or greater than 5:1). Such macromonomers are further described in U.S. Pat. No. 8,399,724, hereby incorporated by reference.

In another embodiment, the vinyl terminated macromonomer has an Mn of 300 g/mol or more (measured by $^1$H NMR, e.g., 300 g/mol to 60,000 g/mol, 400 g/mol to 50,000 g/mol, 500 g/mol to 35,000 g/mol, 300 g/mol to 15,000 g/mol, 400 g/mol to 12,000 g/mol, or 750 g/mol to 10,000 g/mol), and comprises:

(a) from about 80 mol % to about 99.9 mol % of at least one $C_4$ olefin, e.g., about 85 mol % to about 99.9 mol %, e.g., about 90 mol % to about 99.9 mol %;

(b) from about 0.1 mol % to about 20 mol % of propylene, e.g., about 0.1 mol % to about 15 mol %, e.g., about 0.1 mol % to about 10 mol %; and wherein the vinyl terminated macromonomer has at least 40% allyl chain ends (e.g., at least 50% allyl chain ends, at least 60% allyl chain ends, at least 70% allyl chain ends, or at least 80% allyl chain ends, at least 90% allyl chain ends, at least 95% allyl chain ends) relative to total unsaturation, and in some embodiments, an isobutyl chain end to allyl chain end ratio of less than 0.70:1, less than 0.65:1, less than 0.60:1, less than 0.50:1, or less than 0.25:1, and in further embodiments, an allyl chain end to vinylidene group ratio of more than 2:1, more than 2.5:1, more than 3:1, more than 5:1, or more than 10:1. Such macromonomers are also further described in U.S. Pat. No. 8,399,724, which is hereby incorporated by reference.

In other embodiments, the vinyl terminated macromonomer is a propylene co-oligomer having an Mn of 300 g/mol to 30,000 g/mol as measured by $^1$H NMR (e.g., 400 g/mol to 20,000 g/mol, e.g., 500 g/mol to 15,000 g/mol, e.g., 600 g/mol to 12,000 g/mol, e.g., 800 g/mol to 10,000 g/mol, e.g., 900 g/mol to 8,000 g/mol, e.g., 900 g/mol to 7,000 g/mol), comprising 10 mol % to 90 mol % propylene (e.g., 15 mol % to 85 mol %, e.g., 20 mol % to 80 mol %, e.g., 30 mol % to 75 mol %, e.g., 50 mol % to 90 mol %) and 10 mol % to 90 mol % (e.g., 85 mol % to 15 mol %, e.g., 20 mol % to 80 mol %, e.g., 25 mol % to 70 mol %, e.g., 10 mol % to 50 mol %) of one or more alpha-olefin comonomers (e.g., ethylene, butene, hexene, or octene, e.g., ethylene), wherein the oligomer has at least X % allyl chain ends (relative to total unsaturations), where: 1) X=(−0.94 (mol % ethylene incorporated)+100{alternately 1.20 (−0.94 (mol % ethylene incorporated)+100), alternately 1.50(−0.94 (mol % ethylene incorporated)+100)}), when 10 mol % to 60 mol % ethylene is present in the co-oligomer; 2) X=45 (alternately 50, alternately 60), when greater than 60 mol % and less than 70 mol % ethylene is present in the co-oligomer; and 3) X=(1.83*(mol % ethylene incorporated)−83, {alternately 1.20 [1.83*(mol % ethylene incorporated)−83], alternately 1.50 [1.83*(mol % ethylene incorporated)−83]}), when 70 mol % to 90 mol % ethylene is present in the co-oligomer. Such macromonomers are further described in U.S. Pat. No. 8,372,930, which is hereby incorporated by reference.

In other embodiments, the vinyl terminated macromonomer is a propylene oligomer, comprising more than 90 mol % propylene (e.g., 95 mol % to 99 mol %, e.g., 98 mol % to 9 mol %) and less than 10 mol % ethylene (e.g., 1 mol % to 4 mol %, e.g., 1 mol % to 2 mol %), wherein the oligomer has: at least 93% allyl chain ends (e.g., at least 95%, e.g., at least 97%, e.g., at least 98%); a number average molecular weight (Mn) of about 400 g/mol to about 30,000 g/mol, as measured by $^1$H NMR (e.g., 500 g/mol to 20,000 g/mol, e.g., 600 g/mol to 15,000 g/mol, e.g., 700 g/mol to 10,000 g/mol, e.g., 800 g/mol to 9,000 g/mol, e.g., 900 g/mol to 8,000 g/mol, e.g., 1,000 g/mol to 6,000 g/mol); an isobutyl chain end to allylic vinyl group ratio of 0.8:1 to 1.35:1.0, and less than 1400 ppm aluminum, (e.g., less than 1200 ppm, e.g., less than 1000 ppm, e.g., less than 500 ppm, e.g., less than 100 ppm). Such macromonomers are further described in U.S. Pat. No. 8,372,930.

In other embodiments, the vinyl terminated macromonomer is a propylene oligomer, comprising: at least 50 mol % (e.g., 60 mol % to 90 mol %, e.g., 70 mol % to 90 mol %) propylene and from 10 mol % to 50 mol % (e.g., 10 mol % to 40 mol %, e.g., 10 mol % to 30 mol %) ethylene, wherein the oligomer has: at least 90% allyl chain ends (e.g., at least 91%, e.g., at least 93%, e.g., at least 95%, e.g., at least 98%); an Mn of about 150 g/mol to about 20,000 g/mol, as measured by $^1$H NMR (e.g., 200 g/mol to 15,000 g/mol, e.g., 250 g/mol to 15,000 g/mol, e.g., 300 g/mol to 10,000 g/mol, e.g., 400 g/mol to 9,500 g/mol, e.g., 500 g/mol to 9,000 g/mol, e.g., 750 g/mol to 9,000 g/mol); and an isobutyl chain end to allylic vinyl group ratio of 0.8:1 to 1.3:1.0, wherein monomers having four or more carbon atoms are present at from 0 mol % to 3 mol % (e.g., at less than 1 mol %, e.g., less than 0.5 mol %, e.g., at 0 mol %). Such macromonomers are further described in U.S. Pat. No. 8,372,930.

In other embodiments, the vinyl terminated macromonomer is a propylene oligomer, comprising: at least 50 mol % (e.g., at least 60 mol %, e.g., 70 mol % to 99.5 mol %, e.g., 80 mol % to 99 mol %, e.g., 90 mol % to 98.5 mol %) propylene, from 0.1 mol % to 45 mol % (e.g., at least 35 mol %, e.g., 0.5 mol % to 30 mol %, e.g., 1 mol % to 20 mol %, e.g., 1.5 mol % to 10 mol %) ethylene, and from 0.1 mol % to 5 mol % (e.g., 0.5 mol % to 3 mol %, e.g., 0.5 mol % to 1 mol %) $C_4$ to $C_{12}$ olefin (such as butene, hexene, or octene, e.g., butene), wherein the oligomer has: at least 90% allyl chain ends (e.g., at least 91%, e.g., at least 93%, e.g., at least 95%, e.g., at least 98%); a number average molecular weight (Mn) of about 150 g/mol to about 15,000 g/mol, as measured by $^1$H NMR (e.g., 200 g/mol to 12,000 g/mol, e.g., 250 g/mol to 10,000 g/mol, e.g., 300 g/mol to 10,000 g/mol, e.g., 400 g/mol to 9500 g/mol, e.g., 500 g/mol to 9,000 g/mol, e.g., 750 g/mol to 9,000 g/mol); and an isobutyl chain end to allylic vinyl group ratio of 0.8:1 to 1.35:1.0. Such macromonomers are further described in U.S. Pat. No. 8,372,930.

In other embodiments, the vinyl terminated macromonomer is a propylene oligomer, comprising: at least 50 mol % (e.g., at least 60 mol %, e.g., 70 mol % to 99.5 mol %, e.g., 80 mol % to 99 mol %, e.g., 90 mol % to 98.5 mol %) propylene, from 0.1 mol % to 45 mol % (e.g., at least 35 mol %, e.g., 0.5 mol % to 30 mol %, e.g., 1 mol % to 20 mol %, e.g., 1.5 mol % to 10 mol %) ethylene, and from 0.1 mol % to 5 mol % (e.g., 0.5 mol % to 3 mol %, e.g., 0.5 mol % to 1 mol %) diene (such as $C_4$ to $C_{12}$ alpha-omega dienes (such as butadiene, hexadiene, octadiene), norbornene, ethylidene norbornene, vinyl-norbornene, norbornadiene, and dicyclopentadiene), wherein the oligomer has at least 90% allyl chain ends (e.g., at least 91%, e.g., at least 93%, e.g., at least 95%, e.g., at least 98%); a number average molecular weight (Mn) of about 150 g/mol to about 20,000 g/mol, as measured by $^1$H NMR (e.g., 200 g/mol to 15,000 g/mol, e.g., 250 g/mol to 12,000 g/mol, e.g., 300 g/mol to 10,000 g/mol, e.g., 400 g/mol to 9,500 g/mol, e.g., 500 g/mol to 9,000 g/mol, e.g., 750 g/mol to 9,000 g/mol); and an isobutyl chain end to allylic vinyl group ratio of 0.7:1 to 1.35:1.0. Such macromonomers are further described in U.S. Pat. No. 8,372,930.

In other embodiments, the vinyl terminated macromonomer is a propylene homo-oligomer, comprising propylene and less than 0.5 wt % comonomer, e.g., 0 wt % comonomer, wherein the oligomer has:
i) at least 93% allyl chain ends (e.g., at least 95%, e.g., at least 96%, e.g., at least 97%, e.g., at least 98%, e.g., at least 99%);
ii) a number average molecular weight (Mn) of about 500 g/mol to about 20,000 g/mol, as measured by $^1$H NMR (e.g., 500 g/mol to 15,000 g/mol, e.g., 700 g/mol to 10,000 g/mol, e.g., 800 g/mol to 8,000 g/mol, e.g., 900 g/mol to 7,000 g/mol, e.g., 1,000 g/mol to 6,000 g/mol, e.g., 1,000 g/mol to 5,000 g/mol);
iii) an isobutyl chain end to allylic vinyl group ratio of 0.8:1 to 1.3:1.0; and
iv) less than 1400 ppm aluminum, (e.g., less than 1200 ppm, e.g., less than 1000 ppm, e.g., less than 500 ppm, e.g., less than 100 ppm). Such macromonomers are also further described in U.S. Pat. No. 8,372,930.

The vinyl terminated macromonomers may be homopolymers, copolymers, terpolymers, and so on. Any vinyl terminated macromonomers described herein has one or more of:
(i) an isobutyl chain end to allylic vinyl group ratio of 0.8:1 to 1.3:1.0;
(ii) an allyl chain end to vinylidene chain end ratio of greater than 2:1 (e.g., greater than 2.5:1, greater than 3:1, greater than 5:1, or greater than 10:1);
(iii) an allyl chain end to vinylene ratio is greater than 1:1 (e.g., greater than 2:1 or greater than 5:1); and
(iv) at least 5% allyl chain ends (preferably 15%, 20%, 30%, 40%, 50%, 60%, 70%, 80%, 90%, 95%, 98%, or 99%).

Vinyl terminated macromonomers generally have a saturated chain end (or terminus) and/or an unsaturated chain end or terminus. The unsaturated chain end of the vinyl terminated macromonomer comprises an "allyl chain end" or a "3-alkyl" chain end. An allyl chain end is represented by $CH_2CH—CH_2$-, as shown in the formula:

where M represents the polymer chain. "Allylic vinyl group," "allyl chain end," "vinyl chain end," "vinyl termination," "allylic vinyl group," and "vinyl terminated" are used interchangeably in the following description. The number of allyl chain ends, vinylidene chain ends, vinylene chain ends, and other unsaturated chain ends is determined using $^1$H NMR at 120° C. using deuterated tetrachloroethane as the solvent on an at least 250 MHz NMR spectrometer, and in selected cases, confirmed by $^{13}$C NMR. Resconi has reported proton and carbon assignments (neat perdeuterated tetrachloroethane used for proton spectra, while a 50:50 mixture of normal and perdeuterated tetrachloroethane was used for carbon spectra; all spectra were recorded at 100° C. on a BRUKER spectrometer operating at 500 MHz for proton and 125 MHz for carbon) for vinyl terminated oligomers in *J. American Chemical Soc.*, 114, 1992, pp. 1025-1032 that are useful herein. Allyl chain ends are reported as a molar percentage of the total number of moles of unsaturated groups (that is, the sum of allyl chain ends, vinylidene chain ends, vinylene chain ends, and the like).

A 3-alkyl chain end (where the alkyl is a $C_1$ to $C_{38}$ alkyl), also referred to as a "3-alkyl vinyl end group" or a "3-alkyl vinyl termination," is represented by the formula:

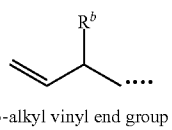

3-alkyl vinyl end group where "••••" represents the polyolefin chain and $R^b$ is a $C_1$ to $C_{38}$ alkyl group, or a $C_1$ to $C_{20}$ alkyl group, such as methyl, ethyl, propyl, butyl, pentyl, hexyl, heptyl, octyl, nonyl, decyl, undecyl, dodecyl, and the like. The amount of 3-alkyl chain ends is determined using $^{13}$C NMR as set out below.

$^{13}$C NMR data is collected at 120° C. at a frequency of at least 100 MHz, using a BRUKER 400 MHz NMR spectrometer. A 90 degree pulse, an acquisition time adjusted to give a digital resolution between 0.1 and 0.12 Hz, at least a 10 second pulse acquisition delay time with continuous broadband proton decoupling using swept square wave modulation without gating is employed during the entire acquisition period. The spectra is acquired with time averaging to provide a signal to noise level adequate to measure the signals of interest. Samples are dissolved in tetrachloroethane-$d_2$ at concentrations between 10 wt % to 15 wt % prior to being inserted into the spectrometer magnet. Prior to data analysis spectra are referenced by setting the chemical shift of the TCE solvent signal to 74.39 ppm. Chain ends for quantization were identified using the signals shown in the table below. N-butyl and n-propyl were not reported due to their low abundance (less than 5%) relative to the chain ends shown in the table below.

| Chain End | $^{13}$C NMR Chemical Shift |
|---|---|
| P~i-Bu | 23-5 to 25.5 and 25.8 to 26.3 ppm |
| E~i-Bu | 39.5 to 40.2 ppm |
| P~Vinyl | 41.5 to 43 ppm |
| E~Vinyl | 33.9 to 34.4 ppm |

The "allyl chain end to vinylidene chain end ratio" is defined to be the ratio of the percentage of allyl chain ends to the percentage of vinylidene chain ends. The "allyl chain end to vinylene chain end ratio" is defined to be the ratio of the percentage of allyl chain ends to the percentage of vinylene chain ends. Vinyl terminated macromonomers typically also have a saturated chain end. In polymerizations where propylene is present, the polymer chain may initiate growth in a propylene monomer, thereby generating an isobutyl chain end. An "isobutyl chain end" is defined to be an end or terminus of a polymer, represented as shown in the formula below:

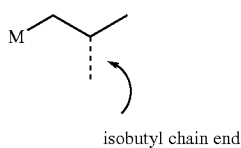

isobutyl chain end where M represents the polymer chain. Isobutyl chain ends are determined according to the procedure set out in WO 2009/155471. The "isobutyl chain end to allylic vinyl group ratio" is defined to be the ratio of the percentage of isobutyl chain ends to the percentage of allyl chain ends. The "isobutyl chain end to alpha bromo carbon ratio" is defined to be the ratio of the percentage of isobutyl chain ends to the percentage of brominated chain ends (at about 34 ppm).

In polymerizations comprising $C_4$ or greater monomers (or "higher olefin" monomers), the saturated chain end may be a $C_4$ or greater (or "higher olefin") chain end, as shown in the formula below:

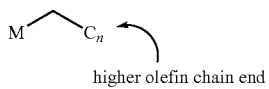

higher olefin chain end where M represents the polymer chain and n is an integer selected from 4 to 40. This is especially true when there is substantially no ethylene or propylene in the polymerization. In an ethylene/($C_4$ or greater monomer) copolymerization, the polymer chain may initiate growth in an ethylene monomer, thereby generating a saturated chain end which is an ethyl chain end. Mn ($^1$H NMR) is determined according to the following NMR method. $^1$H NMR data is collected at either 25° C. or 120° C. (for purposes of the claims, 120° C. shall be used) in a 5 mm probe using a Varian spectrometer with a $^1$H frequency of 250 MHz, 400 MHz, or 500 MHz (for the purpose of the claims, a proton frequency of 400 MHz is used). Data are recorded using a maximum pulse width of 45°, 8 seconds between pulses and signal averaging 120 transients. Spectral signals are integrated and the number of unsaturation types per 1000 carbons is calculated by multiplying the different groups by 1000 and dividing the result by the total number of carbons. Mn is calculated by dividing the total number of unsaturated species into 14,000, and has units of g/mol. The chemical shift regions for the olefin types are defined to be between the following spectral regions.

| Unsaturation Type | Region (ppm) | Number of hydrogens per structure |
|---|---|---|
| Vinyl | 4.95-5.10 | 2 |
| Vinylidene (VYD) | 4.70-4.84 | 2 |
| Vinylene | 5.31-5.55 | 2 |
| Trisubstituted | 5.11-5.30 | 1 |

Unless otherwise stated, Mn (GPC) is determined using the GPC-DRI method described below, however, Nota Bene: for the purpose of the claims, Mn is determined by $^1$H NMR. Mn, Mw, and Mz may be measured by using a Gel Permeation Chromatography (GPC) method using a High Temperature Size Exclusion Chromatograph (SEC, either from Waters Corporation or Polymer Laboratories), equipped with a differential refractive index detector (DRI). Molecular weight distribution (MWD) is Mw (GPC)/Mn (GPC). Experimental details, are described in: T. Sun, P. Brant, R. R. Chance, and W. W. Graessley, *Macromolecules*, Volume 34, Number 19, pp. 6812-6820, (2001) and references therein. Three Polymer Laboratories PLgel 10 mm Mixed-B columns are used. The nominal flow rate is 0.5 cm$^3$/min and the nominal injection volume is 300 µL. The various transfer lines, columns and differential refractometer (the DRI detector) are contained in an oven maintained at 135° C. Solvent for the SEC experiment is prepared by dissolving 6 grams of butylated hydroxy toluene as an antioxidant in 4 liters of Aldrich reagent grade 1,2,4 trichlorobenzene (TCB). The TCB mixture is then filtered through a 0.7 µm glass pre-filter and subsequently through a 0.1 µm Teflon filter. The TCB is then degassed with an online degasser before entering the SEC. Polymer solutions are prepared by placing dry polymer in a glass container, adding the desired amount of TCB, then heating the mixture at 160° C. with continuous agitation for about 2 hours. All quantities are measured gravimetrically. The TCB densities used to express the polymer concentration in mass/volume units are 1.463 g/mL at 25° C. and 1.324 g/mL at 135° C. The injection concentration is from 1.0 to 2.0 mg/mL, with lower concentrations being used for higher molecular weight samples. Prior to running each sample the DRI detector and the injector are purged. Flow rate in the apparatus is then increased to 0.5 mL/minute, and the DRI is allowed to stabilize for 8 to 9 hours before injecting the first sample. The concentration, c, at each point in the chromatogram is calculated from the baseline-subtracted DRI signal, $I_{DRI}$, using the following equation:

$$c = K_{DRI} I_{DRI}/(dn/dc)$$

where $K_{DRI}$ is a constant determined by calibrating the DRI, and (dn/dc) is the refractive index increment for the system. The refractive index, n=1.500 for TCB at 135° C. and λ=690 nm. For purposes of this invention and the claims thereto, (dn/dc)=0.104 for propylene polymers and ethylene polymers, and 0.1 otherwise. Units of parameters used throughout this description of the SEC method are: concentration is expressed in g/cm$^3$, molecular weight is expressed in g/mol, and intrinsic viscosity is expressed in dL/g.

The branching index (g'(vis)) is calculated using the output of the SEC-DRI-LS-VIS method as follows. The average intrinsic viscosity, [η]avg, of the sample is calculated by:

$$[\eta]_{avg} = \frac{\sum c_i [\eta]_i}{\sum c_i}$$

where the summations are over the chromatographic slices, i, between the integration limits.

The branching index g'(vis) is defined as:

$$g'vis = \frac{[\eta]_{avg}}{kM_v^\alpha}$$

where, for purpose of this invention and claims thereto, α=0.695 and k=0.000579 for linear ethylene polymers, α=0.705 and k=0.000262 for linear propylene polymers, and α=0.695 and k=0.000181 for linear butene polymers. Mv is the viscosity-average molecular weight based on molecular weights determined by LS analysis. See Macromolecules, 2001, 34, pp. 6812-6820 and Macromolecules, 2005, 38, pp. 7181-7183, for guidance on selecting a linear standard having similar molecular weight and comonomer content, and determining k coefficients and α exponents.

In an embodiment, the polyolefin is derived from a vinyl terminated propylene polymer. In an embodiment, the vinyl terminated propylene polymer is produced using a process comprising: contacting propylene, under polymerization conditions, with a catalyst system comprising an activator and at least one metallocene compound represented by the formula:

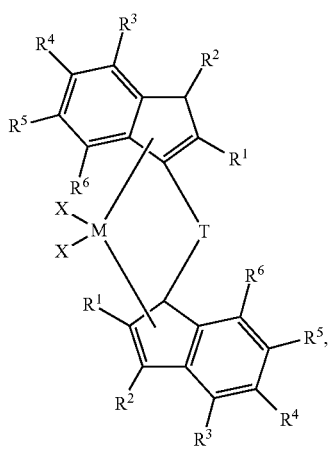

where:

M is hafnium or zirconium;

each X is, independently, selected from the group consisting of hydrocarbyl radicals having from 1 to 20 carbon atoms, hydrides, amides, alkoxides, sulfides, phosphides, halides, dienes, amines, phosphines, ethers, and a combination thereof, (two X's may form a part of a fused ring or a ring system);

each $R^1$ is, independently, a $C_1$ to $C_{10}$ alkyl group;

each $R^2$ is, independently, a $C_1$ to $C_{10}$ alkyl group;

each $R^3$ is hydrogen;

each $R^4$, $R^5$, and $R^6$, is, independently, hydrogen or a substituted hydrocarbyl or unsubstituted hydrocarbyl group, or a heteroatom;

T is a bridging group;

further provided that any of adjacent $R^4$, $R^5$, and $R^6$ groups may form a fused ring or multicenter fused ring system where the rings may be aromatic, partially saturated or saturated; and obtaining a propylene polymer having at least 50% allyl chain ends (relative to total unsaturations), as described in U.S. Pat. No. 8,455,597, which is incorporated by reference in its entirety herein.

In an embodiment, the vinyl terminated propylene polymer is produced using a process comprising:

1) contacting:
a) one or more olefins with
b) a transition metal catalyst compound represented by the formula:

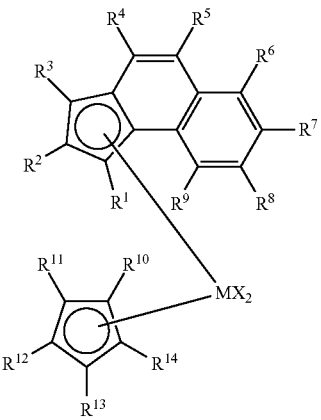

wherein

M is hafnium or zirconium;
each X is, independently, selected from the group consisting of hydrocarbyl radicals having from 1 to 20 carbon atoms, hydrides, amides, alkoxides, sulfides, phosphides, halogens, dienes, amines, phosphines, ethers, or a combination thereof;
each $R^1$ and $R^3$ are, independently, a $C_1$ to $C_8$ alkyl group; and each $R^2$, $R^4$, $R^5$, $R^6$, $R^7$, $R^8$, $R^9$, $R^{10}$, $R^{11}$, $R^{12}$, $R^{13}$, and $R^{14}$ are, independently, hydrogen, or a substituted or unsubstituted hydrocarbyl group having from 1 to 8 carbon atoms, provided however that at least three of the $R^{10}$-$R^{14}$ groups are not hydrogen; and 2) obtaining vinyl terminated polymer having an Mn of 300 g/mol or more and at least 30% allyl chain ends (relative to total unsaturation), as described in U.S. Pat. No. 8,318,998, which is incorporated by reference in its entirety herein.

In an embodiment, the polyolefin chain is derived from a higher olefin copolymer comprising allyl chain ends. In an embodiment, the higher olefin copolymer comprising allyl chain ends has an Mn of 300 g/mol or more (measured by $^1$H NMR) comprising:

(i) from about 20 to about 99.9 mol % of at least one $C_5$ to $C_{40}$ higher olefin; and
(ii) from about 0.1 mol % to about 80 mol % of propylene;
wherein the higher olefin copolymer has at least 40% allyl chain ends, as described in U.S. Pat. No. 8,399,724, which is incorporated by reference in its entirety herein.

In an embodiment, the polyolefin chain is derived from a vinyl terminated branched polyolefin. In an embodiment, the vinyl terminated branched polyolefin has an Mn ($^1$H NMR) of 7,500 to 60,000 g/mol, comprising one or more alpha olefin derived units comprising ethylene and/or propylene, and having;

(i) 50% or greater allyl chain ends, relative to total number of unsaturated chain ends; and
(ii) a g'$_{vis}$ of 0.90 or less, as described in U.S. Publication No. 2012-0245299, which is incorporated by reference in its entirety herein.

In an embodiment, the polyolefin chain is derived from a vinyl terminated branched polyolefin produced by a process for polymerization, comprising:

(i) contacting, at a temperature greater than 35° C., one or more monomers comprising ethylene and/or propylene, with a catalyst system comprising a metallocene catalyst compound and an activator, wherein the metallocene catalyst compound is represented by the following formula:

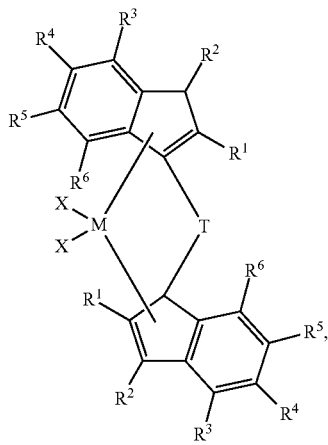

where:
M is selected from the group consisting of zirconium or hafnium;
each X is, independently, selected from the group consisting of hydrocarbyl radicals having from 1 to 20 carbon atoms, hydrides, amides, alkoxides, sulfides, phosphides, halides, dienes, amines, phosphines, ethers, and a combination thereof, (two X's may form a part of a fused ring or a ring system);
each $R^1$, $R^2$, $R^3$, $R^4$, $R^5$, and $R^6$, is, independently, hydrogen or a substituted or unsubstituted hydrocarbyl group, a heteroatom or heteroatom containing group;
further provided that any two adjacent R groups may form a fused ring or multicenter fused ring system where the rings may be aromatic, partially saturated or saturated;
further provided that any of adjacent $R^4$, $R^5$, and $R^6$ groups may form a fused ring or multicenter fused ring system where the rings may be aromatic, partially saturated or saturated;
T is a bridging group represented by the formula $(Ra)_2J$, where J is one or more of C, Si, Ge, N or P, and each Ra is, independently, hydrogen, halogen, $C_1$ to $C_{20}$ hydrocarbyl or a $C_1$ to $C_{20}$ substituted hydrocarbyl, provided that at least one $R^3$ is a substituted or unsubstituted phenyl group, if any of $R^1$, $R^2$, $R^4$, $R^5$, or $R^6$ are not hydrogen;
(ii) converting at least 50 mol % of the monomer to polyolefin; and
(iii) obtaining a branched polyolefin having greater than 50% allyl chain ends, relative to total unsaturated chain ends and a Tm of 60° C. or more, as described in U.S. Publication No. 2012-0245299, which is incorporated by reference in its entirety herein.

In an embodiment of the invention, the polyolefin is derived from a vinyl terminated ethylene polymer, preferably a vinyl terminated polyethylene (preferably in particulate form) having:
(a) at least 60% allyl chain ends (preferably at least 65%, preferably at least 70%, preferably at least 75%, preferably at least 80%, preferably at least 85%, preferably at least 90%, preferably at least 95%, preferably at least 96%, preferably at least 97%, preferably at least 98%, preferably at least 99%, or preferably at least 100%);
(b) a molecular weight distribution of less than or equal to 4.0 (preferably less than or equal to 3.8, preferably less than or equal to 3.5, preferably less than or equal to 3.2, preferably less than or equal to 3.0, preferably less than or equal to 2.8, or preferably less than or equal to 2.5);
(c) an Mn ($^1$H NMR) of at least 20,000 g/mol (preferably at least 25,000 g/mol, preferably at least 30,000 g/mol, preferably at least 40,000 g/mol, preferably at least 50,000 g/mol, and, optionally, less than 125,000 g/mol, preferably less than 120,000, or preferably less than 110,000);
(d) optionally, an Mn (GPC)/Mn ($^1$H NMR) in the range of from about 0.8 to about 1.2 (preferably from about from 0.9 to about 1.1, preferably from about 0.95 to about 1.1); and
(e) optionally, a g'(vis) of greater than 0.95 (preferably greater than 0.96, preferably greater than 0.98, preferably greater than 0.98, and, optionally, preferably less than or equal to 1.0).

Preferably the vinyl terminated ethylene polymers are prepared by a process comprising:
(a) contacting ethylene with a supported metallocene catalyst system; wherein the supported catalyst system comprises: (i) a support material; (ii) an activator having from about 1 wt % to about 14 wt % trimethylaluminum, based on the weight of the activator; (iii) a metallocene compound represented by the formula:

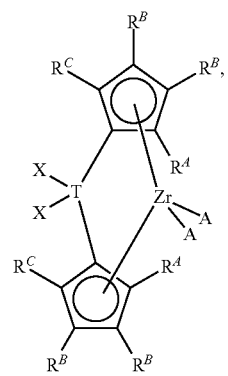

wherein: T is Si or Ge; each $R^A$ is a $C_1$ to $C_{20}$ substituted or unsubstituted hydrocarbyl group; each $R^B$ is, independently, H, or a $C_1$ to $C_8$ substituted or unsubstituted hydrocarbyl group, or a group represented by the formula $-CH_2R^x$; wherein $R^x$ is a $C_1$ to $C_{20}$ substituted or unsubstituted hydrocarbyl group, provided that at least one RB is methyl or a group represented by the formula $-CH_2R^x$; each $R^C$ is, independently, H or a $C_1$ to $C_{20}$ substituted or unsubstituted hydrocarbyl group; each A is independently selected from the group consisting of $C_1$ to $C_{20}$ substituted or unsubstituted hydrocarbyl groups, hydrides, amides, amines, alkoxides, sulfides, phosphides, halides, dienes, phosphines, and ethers; each X is, independently, hydrogen, halogen or a $C_1$ to $C_{20}$ hydrocarbyl, and two X groups can form a cyclic structure including aromatic, partially saturated, or saturated cyclic or fused ring system; further provided that any of adjacent RA, RB, and/or RC groups may form a fused ring or multicenter fused ring systems, where the rings may be substituted or unsubstituted, and may be aromatic, partially unsaturated, or unsaturated; and
(b) obtaining a vinyl terminated polyethylene having: (i) at least 60% allyl chain ends; (ii) a molecular weight distribution of less than or equal to 4.0; and (iii) a Mn ($^1$H NMR) of at least 20,000 g/mol. Preferably the vinyl terminated ethylene polymers are made according the process (and using the catalyst systems) described in (U.S. Ser. No. 61/704,606, filed Sep. 24, 2012, entitled Production of Vinyl Terminated Polyethylene Using Supported Catalyst System).

In an embodiment of the invention, the polyolefin is derived from a vinyl terminated ethylene polymer, preferably a vinyl terminated polyethylene having: (i) at least 50% allyl chain ends (preferably 60%, 70%, 80%, 90%, 95%, 96%, 97%, 98%, 99%, or 100%); (ii) a molecular weight distribution of less than or equal to 4.0 (preferably less than or equal to 3.8, 3.6, 3.5, 3.4, 3.2, 3.0, 2.8, or 2.5); (iii) a g'(vis) of 0.95 or less (preferably less than 0.93, 0.90, 0.88, or 0.85); (iv) an Mn ($^1$H NMR) of at least 7,000 g/mol (preferably at least 10,000 g/mol, 15,000 g/mol, 20,000 g/mol, 25,000 g/mol, 30,000 g/mol, 45,000 g/mol, 55,000 g/mol, 65,000 g/mol, or 85,000 g/mol, and, optionally, less than 125,000 g/mol); and (v) a Mn (GPC)/Mn ($^1$H NMR) in the range of from about 0.8 to about 1.2 (preferably from 0.85 to 1.15, 0.90 to 1.10, and 0.95 to 1.00). Preferably the vinyl terminated ethylene polymers are produced by a process comprising:
(a) contacting ethylene with a metallocene catalyst system; wherein the catalyst system comprises:
  (i) an ionizing activator;
  (ii) a metallocene compound represented by the formula:

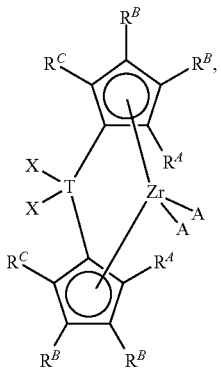

wherein T is Si or Ge; each $R^A$ is a $C_1$ to $C_{20}$ substituted or unsubstituted hydrocarbyl group; each $R^B$ is, independently, H or a $C_1$ to $C_8$ substituted or unsubstituted hydrocarbyl group, or a group represented by the formula —CH$_2$Rx; wherein $R^x$ is a $C_1$ to $C_{20}$ substituted or unsubstituted hydrocarbyl group, provided that at least one $R^B$ is methyl or a group represented by the formula —CH$_2$R$^x$; each $R^C$ is, independently, H or a $C_1$ to $C_{20}$ substituted or unsubstituted hydrocarbyl group; each A is independently selected from the group consisting of $C_1$ to $C_{20}$ substituted or unsubstituted hydrocarbyl groups, hydrides, amides, amines, alkoxides, sulfides, phosphides, halides, dienes, phosphines, and ethers; each X is, independently, hydrogen, halogen, or a $C_1$ to $C_{20}$ hydrocarbyl, and two X groups can form a cyclic structure including aromatic, partially saturated, or saturated cyclic or fused ring system; further provided that any of adjacent $R^A$, $R^B$, and/or $R^C$ groups may form a fused ring or multicenter fused ring systems, where the rings may be substituted or unsubstituted, and may be aromatic, partially unsaturated, or unsaturated; and
(b) obtaining a vinyl terminated polyethylene having: (i) at least 50% allyl chain ends; (ii) a molecular weight distribution of less than or equal to 4.0; (iii) a g'(vis) of 0.95 or less; and (iv) a Mn ($^1$H NMR) of at least 7,000 g/mol; and (e) a Mn (GPC)/Mn ($^1$H NMR) in the range of from about 0.8 to about 1.2. Preferably the vinyl terminated ethylene polymers are made according the process (and using the catalyst systems) described in (U.S. Ser. No. 61/704,604, filed Sep. 24, 2012, entitled Production of Vinyl Terminated Polyethylene).

In any of the polymerizations described herein, the activator may be an alumoxane, an aluminum alkyl, a stoichiometric activator (also referred to as an ionizing activator), which may be neutral or ionic, and/or a conventional-type cocatalyst, unless otherwise stated. Preferred activators typically include alumoxane compounds, modified alumoxane compounds, stoichiometric activators, and ionizing anion precursor compounds that abstract one reactive, σ-bound, metal ligand making the metal complex cationic and providing a charge-balancing noncoordinating or weakly coordinating anion.

Alumoxane Activators

In an embodiment of the invention, alumoxane activators are utilized as an activator in the catalyst composition, preferably methylalumoxane (MAO), modified methylalumoxane (MMAO), ethylalumoxane, and/or isobutylalumoxane. Preferably, the activator is a TMA-depleted activator (where TMA means trimethylaluminum). Any method known in the art to remove TMA may be used. For example, to produce a TMA-depleted activator, a solution of alumoxane (such as methylalumoxane), for example, 30 wt % in toluene may be diluted in toluene and the aluminum alkyl (such as TMA in the case of MAO) is removed from the solution, for example, by combination with trimethylphenol and filtration of the solid. In such embodiments, the TMA-depleted activator comprises from about 1 wt % to about 14 wt % trimethylaluminum (preferably less than 13 wt %, preferably less than 12 wt %, preferably less than 10 wt %, preferably less than 5 wt %, or preferably 0 wt %, or, optionally, greater than 0 wt % or greater than 1 wt %).

Stoichiometric Activators

The catalyst systems useful herein may comprise one or more stoichiometric activators. A stoichiometric activator is a non-alumoxane compound which when combined in a reaction with the catalyst compound (such as a metallocene compound) forms a catalytically active species, typically at molar ratios of stoichiometric activator to metallocene compound of 10:1 or less (preferably 5:1, more preferably 2:1, or even more preferably 1:1), however is within the scope of this invention to use a molar ratio of stoichiometric activator to metallocene compound of greater than 10:1 as well. Useful stoichiometric (or non-alumoxane) activator-to-catalyst ratios range from 0.5:1 to 10:1, preferably 1:1 to 5:1, although ranges of from 0.1:1 to 100:1, alternately from 0.5:1 to 200:1, alternately from 1:1 to 500:1 alternately from 1:1 to 1000:1 may be used.

Stoichiometric activators are non-alumoxane compounds which may be neutral or ionic, such as tri(n-butyl)ammonium tetrakis(pentafluorophenyl)borate, a tris perfluorophenyl boron metalloid precursor, or a tris perfluoronaphthyl boron metalloid precursor, polyhalogenated heteroborane anions (WO 98/43983), boric acid (U.S. Pat. No. 5,942,459), or a combination thereof. It is also within the scope of this invention to use stoichiometric activators alone or in combination with alumoxane or modified alumoxane activators.

Neutral Stoichiometric Activators

Examples of neutral stoichiometric activators include trisubstituted boron, tellurium, aluminum, gallium and indium or mixtures thereof. The three substituent groups are each independently selected from alkyls, alkenyls, halogens, substituted alkyls, aryls, arylhalides, alkoxy, and halides. Preferably, the three groups are independently selected from halogen, mono or multicyclic (including halosubstituted) aryls, alkyls, and alkenyl compounds, and mixtures thereof, preferred are alkenyl groups having 1 to 20 carbon atoms, alkyl groups having 1 to 20 carbon atoms, alkoxy groups having 1 to 20 carbon atoms, and aryl groups having 3 to 20 carbon atoms (including substituted aryls). More preferably, the three groups are alkyls having 1 to 4 carbon groups, phenyl, naphthyl, or mixtures thereof. Even more preferably, the three groups are halogenated, preferably fluorinated, aryl groups. Most preferably, the neutral stoichiometric activator is tris perfluorophenyl boron or tris perfluoronaphthyl boron.

Ionic Stoichiometric Activators

Ionic stoichiometric activators may contain an active proton, or some other cation associated with, but not coordinated to, or only loosely coordinated to, the remaining anion of the activator. Such compounds and the like are described in European publications EP 0 570 982 A; EP 0 520 732 A; EP 0 495 375 A; EP 0 500 944 B1; EP 0 277 003 A; EP 0 277 004 A; U.S. Pat. Nos. 5,153,157; 5,198,401; 5,066,741; 5,206,197; 5,241,025; 5,384,299; 5,502,124; and U.S. patent application Ser. No. 08/285,380, filed Aug. 3, 1994; all of which are herein fully incorporated by reference.

Ionic stoichiometric activators comprise a cation, which is preferably a Bronsted acid capable of donating a proton, and a compatible non-coordinating anion. Preferably, the anion is relatively large (bulky), capable of stabilizing the catalytically active species (preferably a group 4 catalytically active species) which is formed when the catalyst (such as a metallocene compound) and the stoichiometric activator are combined. Preferably the anion will be sufficiently labile to be displaced by olefinic, diolefinic and acetylenically unsaturated substrates or other neutral Lewis bases, such as ethers, amines, and the like. Two classes of useful compatible non-coordinating anions have been disclosed in EP 0 277,003 A and EP 0 277,004 A: 1) anionic coordination complexes comprising a plurality of lipophilic radicals covalently coordinated to and shielding a central charge-bearing metal or metalloid core, and 2) anions comprising a plurality of boron atoms, such as carboranes, metallacarboranes, and boranes.

Ionic stoichiometric activators comprise an anion, preferably a non-coordinating anion. The term "non-coordinating anion" (NCA) means an anion which either does not coordinate to said cation or which is only weakly coordinated to said cation thereby remaining sufficiently labile to be displaced by a neutral Lewis base. "Compatible" non-coordinating anions are those which are not degraded to neutrality when the initially formed complex decomposes. Further, the anion will not transfer an anionic substituent or fragment to the cation so as to cause it to form a neutral four coordinate metallocene compound and a neutral by-product from the anion. Non-coordinating anions useful in accordance with this invention are those that are compatible, stabilize the catalyst (such as metallocene) cation in the sense of balancing its ionic charge at +1, yet retain sufficient lability to permit displacement by an ethylenically or acetylenically unsaturated monomer during polymerization.

In a preferred embodiment of this invention, the ionic stoichiometric activators are represented by the following formula (1):

$$(Z)_d^+ A^{d-}, \quad (1)$$

wherein $(Z)_d^+$ is the cation component and $A^{d-}$ is the anion component; where Z is (L-H) or a reducible Lewis Acid, L is an neutral Lewis base; H is hydrogen; (L-H)$^+$ is a Bronsted acid; $A^{d-}$ is a non-coordinating anion having the charge d−; and d is an integer from 1 to 3.

When Z is (L-H) such that the cation component is $(L-H)_d^+$, the cation component may include Bronsted acids such as protonated Lewis bases capable of protonating a moiety, such as an alkyl or aryl, from the bulky ligand metallocene containing transition metal catalyst precursor, resulting in a cationic transition metal species. Preferably, the activating cation (L-H)$_d^+$ is a Bronsted acid, capable of donating a proton to the transition metal catalytic precursor resulting in a transition metal cation, including ammoniums, oxoniums, phosphoniums, silyliums, and mixtures thereof, preferably ammoniums of methylamine, aniline, dimethylamine, diethylamine, N-methylaniline, diphenylamine, trimethylamine, triethylamine, N,N-dimethylaniline, methyldiphenylamine, pyridine, p-bromo N,N-dimethylaniline, p-nitro-N, N-dimethylaniline, phosphoniums from triethylphosphine, triphenylphosphine, and diphenylphosphine, oxoniums from ethers, such as dimethyl ether diethyl ether, tetrahydrofuran, and dioxane, sulfoniums from thioethers, such as diethyl thioethers and tetrahydrothiophene, and mixtures thereof.

When Z is a reducible Lewis acid, $(Z)_d^+$ is preferably represented by the formula: $(Ar_3C)^+$, where Ar is aryl or aryl substituted with a heteroatom, a $C_1$ to $C_{40}$ hydrocarbyl, or a substituted $C_1$ to $C_{40}$ hydrocarbyl, preferably $(Z)_d^+$ is represented by the formula: $(Ph_3C)^+$, where Ph is phenyl or phenyl substituted with a heteroatom, a $C_1$ to $C_{40}$ hydrocarbyl, or a substituted $C_1$ to $C_{40}$ hydrocarbyl. In a preferred embodiment, the reducible Lewis acid is triphenyl carbenium.

The anion component $A^{d-}$ includes those having the formula $[M^{k+}Q_n]^{d-}$ wherein k is 1, 2, or 3; n is 1, 2, 3, 4, 5, or 6, preferably 3, 4, 5 or 6; (n−k)=d; M is an element selected from group 13 of the Periodic Table of the Elements, preferably boron or aluminum; and each Q is, independently, a hydride, bridged or unbridged dialkylamido, halide, alkoxide, aryloxide, hydrocarbyl, substituted hydrocarbyl, halocarbyl, substituted halocarbyl, and halosubstituted-hydrocarbyl radicals, said Q having up to 20 carbon atoms with the proviso that in not more than one occurrence is Q a halide, and two Q groups may form a ring structure. Preferably, each Q is a fluorinated hydrocarbyl group having 1 to 20 carbon atoms, more preferably each Q is a fluorinated aryl group, and most preferably each Q is a pentafluoryl aryl group. Examples of suitable $A^{d-}$ components also include diboron compounds as disclosed in U.S. Pat. No. 5,447,895, which is fully incorporated herein by reference.

In other embodiments of this invention, the ionic stoichiometric activator may be an activator comprising expanded anions, represented by the formula:

$$(A^*+a)_b(Z^*J^*_j)^{-c}_d,$$

wherein A* is a cation having charge +a; Z* is an anion group of from 1 to 50 atoms not counting hydrogen atoms, further containing two or more Lewis base sites; J* independently each occurrence is a Lewis acid coordinated to at least one Lewis base site of Z*, and optionally two or more such J* groups may be joined together in a moiety having multiple Lewis acid functionality; j is a number from 2 to 12; and a, b, c, and d are integers from 1 to 3, with the proviso that axb is equal to cxd. Examples of such activators comprising expandable anions may be found in U.S. Pat. No. 6,395,671, which is fully incorporated herein by reference.

Examples of ionic stoichiometric activators useful in the catalyst system of this invention are: trimethylammonium tetraphenylborate, triethylammonium tetraphenylborate, tripropylammonium tetraphenylborate, tri(n-butyl)ammonium tetraphenylborate, tri(t-butyl)ammonium tetraphenylborate, N,N-dimethylanilinium tetraphenylborate, N,N-diethylanilinium tetraphenylborate, N,N-dimethyl-(2,4,6-trimethylanilinium)tetraphenylborate, tropillium tetraphenylborate, triphenylcarbenium tetraphenylborate, triphenylphosphonium tetraphenylborate triethylsilylium tetraphenylborate, benzene(diazonium)tetraphenylborate, trimethylammonium tetrakis(pentafluorophenyl)borate, triethylammonium tetrakis(pentafluorophenyl)borate, tripropylammonium tetrakis(pentafluorophenyl)borate, tri(n-butyl)ammonium tetrakis(pentafluorophenyl)borate, tri(sec-butyl)ammonium tetrakis(pentafluorophenyl)borate, N,N-dimethylanilinium tetrakis(pentafluorophenyl)borate, N,N-diethylanilinium tetrakis(pentafluorophenyl)borate, N,N-dimethyl-(2,4,6-trimethylanilinium) tetrakis(pentafluorophenyl)borate, tropillium tetrakis(pentafluorophenyl)borate, triphenylcarbenium tetrakis(pentafluorophenyl)borate, triphenylphosphonium tetrakis(pentafluorophenyl)borate, triethylsilylium tetrakis(pentafluorophenyl)borate, benzene(diazonium) tetrakis(pentafluorophenyl)borate, trimethylammonium tetrakis-(2,3,4,6-tetrafluorophenyl)borate, triethylammonium tetrakis-(2,3,4,6-tetrafluorophenyl)borate, tripropylammonium tetrakis-(2,3,4,6-tetrafluorophenyl)borate, tri(n-butyl)ammonium tetrakis-(2,3,4,6-tetrafluorophenyl)borate, dimethyl(t-butyl)ammonium tetrakis-(2,3,4,6-tetrafluorophenyl)borate, N,N-dimethylanilinium tetrakis-(2,3,4,6-tetrafluorophenyl)borate, N,N-diethylanilinium tetrakis-(2,3,4,6-tetrafluorophenyl)borate, N,N-dimethyl-(2,4,6-trimethylanilinium) tetrakis-(2,3,4,6-tetrafluorophenyl)borate, tropillium tetrakis-(2,3,4,6-tetrafluorophenyl)borate, triphenylcarbenium tetrakis-(2,3,4,6-tetrafluorophenyl)borate, triphenylphosphonium tetrakis-(2,3,4,6-tetrafluorophenyl)borate, triethylsilylium tetrakis-(2,3,4,6-tetrafluorophenyl)borate, benzene(diazonium) tetrakis-(2,3,4,6-tetrafluorophenyl)borate, trimethylammonium tetrakis(perfluoronaphthyl)borate, triethylammonium tetrakis(perfluoronaphthyl)borate, tripropylammonium tetrakis(perfluoronaphthyl)borate, tri(n-butyl)ammonium tetrakis(perfluoronaphthyl)borate, tri(t-butyl)ammonium tetrakis(perfluoronaphthyl)borate, N,N-dimethylanilinium tetrakis(perfluoronaphthyl)borate, N,N-diethylanilinium tetrakis(perfluoronaphthyl)borate, N,N-dimethyl-(2,4,6-trimethylanilinium) tetrakis(perfluoronaphthyl)borate, tropillium tetrakis(perfluoronaphthyl)borate, triphenylcarbenium tetrakis(perfluoronaphthyl)borate, triphenylphosphonium tetrakis(perfluoronaphthyl)borate, triethylsilylium tetrakis(perfluoronaphthyl)borate, benzene(diazonium) tetrakis(perfluoronaphthyl)borate, trimethylammonium tetrakis(perfluorobiphenyl)borate, triethylammonium tetrakis(perfluorobiphenyl)borate, tripropylammonium tetrakis(perfluorobiphenyl)borate, tri(n-butyl)ammonium tetrakis(perfluorobiphenyl)borate, tri(t-butyl)ammonium tetrakis(perfluorobiphenyl)borate, N,N-dimethylanilinium tetrakis(perfluorobiphenyl)borate, N,N-diethylanilinium tetrakis(perfluorobiphenyl)borate, N,N-dimethyl-(2,4,6-trimethylanilinium) tetrakis(perfluorobiphenyl)borate, tropillium tetrakis(perfluorobiphenyl)borate, triphenylcarbenium tetrakis(perfluorobiphenyl)borate, triphenylphosphonium tetrakis(perfluorobiphenyl)borate, triethylsilylium tetrakis(perfluorobiphenyl)borate, benzene(diazonium) tetrakis(perfluorobiphenyl)borate, trimethylammonium tetrakis(3,5-bis(trifluoromethyl)phenyl)borate, triethylammonium tetrakis(3,5-bis(trifluoromethyl)phenyl)borate, tripropylammonium tetrakis(3,5-bis(trifluoromethyl)phenyl)borate, tri(n-butyl)ammonium tetrakis(3,5-bis(trifluoromethyl)phenyl)borate, tri(t-butyl)ammonium tetrakis(3,5-bis(trifluoromethyl)phenyl)borate, N,N-dimethylanilinium tetrakis(3,5-bis(trifluoromethyl)phenyl)borate, N,N-diethylanilinium tetrakis(3,5-bis(trifluoromethyl)phenyl)borate, N,N-dimethyl-(2,4,6-trimethylanilinium) tetrakis(3,5-bis(trifluoromethyl)phenyl)borate, tropillium tetrakis(3,5-bis(trifluoromethyl)phenyl)borate, triphenylcarbenium tetrakis(3,5-bis(trifluoromethyl)phenyl)borate, triphenylphosphonium tetrakis(3,5-bis(trifluoromethyl)phenyl)borate, triethylsilylium tetrakis(3,5-bis(trifluoromethyl)phenyl)borate, benzene(diazonium) tetrakis(3,5-bis(trifluoromethyl)phenyl)borate, and dialkyl ammonium salts such as: di-(i-propyl)ammonium tetrakis(pentafluorophenyl)borate, and dicyclohexylammonium tetrakis(pentafluorophenyl)borate; and additional tri-substituted phosphonium salts such as tri(o-tolyl)phosphonium tetrakis(pentafluorophenyl)borate, and tri(2,6-dimethylphenyl)phosphonium tetrakis(pentafluorophenyl)borate.

Most preferably, the ionic stoichiometric activator is N,N-dimethylanilinium tetrakis(perfluoronaphthyl)borate, N,N-dimethylanilinium tetrakis(perfluorobiphenyl)borate, N,N-dimethylanilinium tetrakis(3,5-bis(trifluoromethyl)phenyl)borate, triphenylcarbenium tetrakis(perfluoronaphthyl)borate, triphenylcarbenium tetrakis(perfluorobiphenyl)borate, triphenylcarbenium tetrakis(3,5-bis(trifluoromethyl)phenyl)borate, or triphenylcarbenium tetrakis(perfluorophenyl)borate.

Bulky Ionic Stoichiometric Activators

"Bulky activator" as used herein refers to ionic stoichiometric activators represented by the formula:

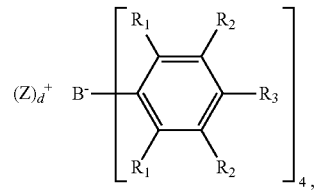

where:
each $R_1$ is, independently, a halide, preferably a fluoride;
each $R_2$ is, independently, a halide, a $C_6$ to $C_{20}$ substituted aromatic hydrocarbyl group or a siloxy group of the formula —O—Si—$R_a$, where $R_a$ is a $C_1$ to $C_{20}$ substituted or unsubstituted hydrocarbyl or hydrocarbylsilyl group (preferably $R_2$ is a fluoride or a perfluorinated phenyl group);
each $R_3$ is a halide, $C_6$ to $C_{20}$ substituted aromatic hydrocarbyl group or a siloxy group of the formula —O—Si—$R_a$, where $R_a$ is a $C_1$ to $C_{20}$ substituted or unsubstituted hydrocarbyl or hydrocarbylsilyl group (preferably $R_3$ is a fluoride or a $C_6$ perfluorinated aromatic hydrocarbyl group); wherein $R_2$ and $R_3$ can form one or more saturated or unsaturated, substituted or unsubstituted rings (preferably $R_2$ and $R_3$ form a perfluorinated phenyl ring);
$(Z)_d^+$ is the cation component; where Z is (L-H) or a reducible Lewis Acid, L is an neutral Lewis base; H is hydrogen; $(L-H)^+$ is a Bronsted acid; and d is an integer from 1 to 3; wherein the boron anion component has a molecular weight of greater than 1020 g/mol; and wherein at least three of the substituents on the B atom each have a molecular volume of greater than 250 cubic Å, alternately greater than 300 cubic Å, or alternately greater than 500 cubic Å.

"Molecular volume" is used herein as an approximation of spatial steric bulk of an activator molecule in solution. Comparison of substituents with differing molecular volumes allows the substituent with the smaller molecular volume to be considered "less bulky" in comparison to the substituent with the larger molecular volume. Conversely, a substituent with a larger molecular volume may be considered "more bulky" than a substituent with a smaller molecular volume.

Molecular volume may be calculated as reported in "A Simple 'Back of the Envelope' Method for Estimating the Densities and Molecular Volumes of Liquids and Solids," Journal of Chemical Education, Vol. 71, No. 11, November 1994, pp. 962-964. Molecular volume (MV), in units of cubic Å, is calculated using the formula: $MV=8.3V_S$, where $V_S$ is the scaled volume. $V_S$ is the sum of the relative volumes of the constituent atoms, and is calculated from the molecular formula of the substituent using the following table of relative volumes. For fused rings, the $V_S$ is decreased by 7.5% per fused ring.

| Element | Relative Volume |
| --- | --- |
| H | 1 |
| 1st short period, Li to F | 2 |
| 2nd short period, Na to Cl | 4 |
| 1st long period, K to Br | 5 |
| 2nd long period, Rb to I | 7.5 |
| 3rd long period, Cs to Bi | 9 |

Exemplary bulky substituents of activators suitable herein and their respective scaled volumes and molecular volumes are shown in the table below. The dashed bonds indicate binding to boron, as in the general formula above.

| Activator | Structure of boron substituents | Molecular Formula of each substituent | $V_s$ | MV Per subst. (Å$^3$) | Total MV (Å$^3$) |
| --- | --- | --- | --- | --- | --- |
| Dimethylanilinium tetrakis(perfluoronaphthyl)borate | | $C_{10}F_7$ | 34 | 261 | 1044 |
| Dimethylanilinium tetrakis(perfluorobiphenyl)borate | | $C_{12}F_9$ | 42 | 349 | 1396 |
| [4-tButyl-PhNMe$_2$H] [(C$_6$F$_3$(C$_6$F$_5$)$_2$)$_4$B] | | $C_{18}F_{13}$ | 62 | 515 | 2060 |

Exemplary bulky ionic stoichiometric activators useful in catalyst systems herein include: trimethylammonium tetrakis (perfluoronaphthyl)borate, triethylammonium tetrakis(perfluoronaphthyl)borate, tripropylammonium tetrakis(perfluoronaphthyl)borate, tri(n-butyl)ammonium tetrakis (perfluoronaphthyl)borate, tri(t-butyl)ammonium tetrakis (perfluoronaphthyl)borate, N,N-dimethylanilinium tetrakis (perfluoronaphthyl)borate, N,N-diethylanilinium tetrakis (perfluoronaphthyl)borate, N,N-dimethyl-(2,4,6-trimethylanilinium) tetrakis(perfluoronaphthyl)borate, tropillium tetrakis(perfluoronaphthyl)borate, triphenylcarbenium tetrakis(perfluoronaphthyl)borate, triphenylphosphonium tetrakis(perfluoronaphthyl)borate, triethylsilylium tetrakis(perfluoronaphthyl)borate, benzene(diazonium) tetrakis (perfluoronaphthyl)borate, trimethylammonium tetrakis (perfluorobiphenyl)borate, triethylammonium tetrakis (perfluorobiphenyl)borate, tripropylammonium tetrakis (perfluorobiphenyl)borate, tri(n-butyl)ammonium tetrakis (perfluorobiphenyl)borate, tri(t-butyl)ammonium tetrakis (perfluorobiphenyl)borate, N,N-dimethylanilinium tetrakis (perfluorobiphenyl)borate, N,N-diethylanilinium tetrakis (perfluorobiphenyl)borate, N,N-dimethyl-(2,4,6-trimethylanilinium) tetrakis(perfluorobiphenyl)borate, tropillium tetrakis(perfluorobiphenyl)borate, triphenylcarbenium tetrakis(perfluorobiphenyl)borate, triphenylphosphonium tetrakis(perfluorobiphenyl)borate, triethylsilylium tetrakis(perfluorobiphenyl)borate, benzene(diazonium) tetrakis (perfluorobiphenyl)borate, [4-t-butyl-PhNMe$_2$H][(C$_6$F$_3$ (C$_6$F$_5$)$_2$)$_4$B], (where Ph is phenyl and Me is methyl), and the types disclosed in U.S. Pat. No. 7,297,653.

In another embodiment of this invention, an activation method using ionic compounds not containing an active proton but capable of producing a bulky ligand metallocene catalyst cation and their non-coordinating anion are also contemplated, and are described in EP 0 426 637 A, EP 0 573 403 A, and U.S. Pat. No. 5,387,568, which are all herein incorporated by reference.

In another embodiment of this invention, inventive processes also can employ stoichiometric activator compounds that are initially neutral Lewis acids but form a cationic metal complex and a noncoordinating anion, or a zwitterionic complex upon reaction with the metallocene compounds. For example, tris(pentafluorophenyl)boron or aluminum may act to abstract a hydrocarbyl or hydride ligand to yield an invention cationic metal complex and stabilizing noncoordinating anion, see EP 0 427 697 A and EP 0 520 732 A for illustrations of analogous group 4 metallocene compounds. Also, see the methods and compounds of EP 0 495 375 A. For formation of zwitterionic complexes using analogous group 4 compounds, see U.S. Pat. Nos. 5,624,878; 5,486,632; and 5,527,929.

In another embodiment of this invention, another suitable ionic stoichiometric activator comprises a salt of a cationic oxidizing agent and a noncoordinating, compatible anion represented by the formula:

$$(X^{e+})_d(A^{d-})_e \quad (3)$$

wherein $X^{e+}$ is a cationic oxidizing agent having a charge of e+; e is 1, 2, or 3; $A^{d-}$ is a non-coordinating anion having the charge d−; and d is 1, 2, or 3. Examples of $X^{e+}$ include: ferrocenium, hydrocarbyl-substituted ferrocenium, $Ag^+$, or $Pb^{+2}$. Preferred embodiments of $A^{d-}$ are those anions previously defined with respect to the Bronsted acid containing activators, especially tetrakis(pentafluorophenyl)borate.

Activator Combinations

It is within the scope of this invention that metallocene compounds can be combined with one or more activators or activation methods described above. For example, a combination of activators have been described in U.S. Pat. Nos. 5,153,157; 5,453,410; European Publication No. EP 0 573 120 B1; PCT Publication Nos. WO 94/07928; and WO 95/14044. These documents all discuss the use of an alumoxane in combination with a stoichiometric activator.

In another embodiment, the vinyl terminated macromonomer may be a vinyl terminated ethylene macromonomer. In some embodiments, a phenoxyimine-based catalyst (a Mitsui FI catalyst) or a pyrroleimine-based catalyst (a Mitsui PI catalyst) can be used to prepare the vinyl terminated ethylene macromonomer. These catalysts comprise (a) a transition metal (preferably Ti) compound having phenoxyimine or pyrroleimine as a ligand, and (b) one or more kind(s) of compound selected from (b-1) an organic metal compound, (b-2) an organic aluminumoxy compound, and (b-3) a compound that reacts with the transition metal compound (a) to form an ion pair, as described in JP-A-2001-72706, JP-A-2002-332312, JP-A-2003-313247, JP-A-2004-107486, and JP-A-2004-107563. Herein, as the transition metal contained in the transition metal compound, the transition metal of Groups 3 to 11 in the periodic table can be used. Preferred catalysts to prepare the vinyl terminated ethylene macromonomer include those described in U.S. Pat. No. 7,795, 347, specifically at column 16, line 56 et seq. in Formula (XI).

In another embodiment, the vinyl terminated macromonomer may be a vinyl terminated isotactic polypropylene or a vinyl terminated polyethylene as disclosed in U.S. Pat. Nos. 6,444,773; 6,555,635; 6,147,180; 6,660,809; 6,750,307; 6,774,191; 6,169,154; and EP 0 958 309; which are incorporated by reference herein.

In a preferred embodiment any vinyl terminated macromonomer described herein can be fractionated or distilled by any means know in the art and one or more of the fractions may be used in the invention described herein. Preferred fractions typically have a narrow Mw/Mn, such as less than 1.5, preferably 1.4 or less, preferably 1.3 or less, preferably 1.2 or less. Alternately the Mw/Mn is from 1 to 1.4, preferably 1.05 to 1.3, preferably 1.1 to 1.2.

In another embodiment of the invention, the fractions have a narrow boiling point range (as determined by ASTM D86) of less than 70° C., preferably less than 60° C., preferably less than 50° C., preferably less than 40° C., preferably less than 30° C., preferably less than 20° C., preferably less than 10° C.

In a preferred embodiment of the invention, the vinyl terminated macromonomer injected into a gas chromatograph column to determine the optimum cut points for the fractionation.

In a preferred embodiment, the fractions may be obtained by separation of the vinyl terminated macromonomer product such as by the processes described in GB 1550419A, U.S. Pat. Nos. 3,647,906 and 3,592,866. Useful fractions include ranges from about 4 carbon-numbers up to 20 carbon-numbers, e.g., $C_4$-$C_8$, $C_4$-$C_{14}$, $C_4$-$C_{20}$. The lower α-olefin fraction may contain α-olefins having the same carbon-number as the lowest α-olefin in the higher α-olefin fraction, but preferably contains only α-olefins of carbon-numbers lower than the carbon-number of the lowest α-olefin in the higher α-olefin fraction. The higher (α-olefin fraction may include α-olefins of the same carbon number as the highest α-olefin in the lower α-olefin fraction up to the highest α-olefin produced in the reaction, but generally not higher than $C_{40}$. Preferably, however, the higher α-olefin fraction contains only (α-olefins of carbon-numbers higher than the carbon number of the highest α-olefin in the lower α-olefin fraction.

In a separation where an α-olefin product mixture free of light oligomers, e.g., dimers, trimers, tetramers, etc., is desired, the lower α-olefin fraction is further separated into a light α-olefin fraction and an intermediate α-olefin fraction. The light α-olefin fraction may include from $C_4$ up to $C_{12}$, e.g., $C_4$-$C_6$, $C_4$-$C_8$, $C_4$-$C_{10}$, etc. In this modification, the intermediate α-olefin fraction is removed as product and the light α-olefin fraction is converted to additional intermediate α-olefins.

In another embodiment, any vinyl terminated macromonomer described herein can be separated into different boiling point cuts by distillation performed according to the procedures described in ASTM methods D2892 and D5236. (D2892: Standard Test Method for Distillation of Crude Petroleum (15-Theoretical Plate Column) and D5236: Standard Test Method for Distillation of Heavy Hydrocarbon Mixtures (Vacuum Potstill Method).)

For example a low molecular weight atactic polypropylene VTM (677.3 gram charge) can be fractionated or distilled using the boiling point range, mass recovery, vacuum conditions listed below. Both initial boiling point (IBP) and final boiling point (FBP) are in degree Fahrenheit (° F.) and corrected to atmospheric pressure.

| Fraction (Cut) # | Initial boiling point/IBP (° F.) | Final boiling point/FBP (° F.) | Weight of collected fraction (grams) | Still pressure (mmHg) | ASTM method used |
|---|---|---|---|---|---|
| Charge (Feed) | — | — | 677.3 | | |
| 1 | IBP | 140 | 3.8 | 760 | D2892 |
| 2 | 140 | 160 | 11.9 | 760 | D2892 |
| 3 | 160 | 265 | 27.8 | 760 | D2892 |
| 4 | 265 | 365 | 35.0 | 88 | D2892 |
| 5 | 365 | 465 | 46.6 | 88 | D2892 |
| 6 | 465 | 525 | 34.4 | 88 | D2892 |
| 7 | 525 | 568 | 44.0 | 10 | D2892 |

| Fraction (Cut) # | Initial boiling point/IBP (° F.) | Final boiling point/FBP (° F.) | Weight of collected fraction (grams) | Still pressure (mmHg) | ASTM method used |
|---|---|---|---|---|---|
| 8 | 568 | 588 | 14.2 | 10 | D2892 |
| 9 | 588 | 645 | 53.1 | 10 | D2892 |
| 10 | 645 | 700 | 63.4 | 2 | D2892 |
| 11 | 700 | 844 | 41.2 | 0.2 | D5236 |
| 12 | 844 | 892 | 42.3 | 0.2 | D5236 |
| 13 | 892 | 904 | 17.9 | 0.2 | D5236 |
| Distillation Bottoms | 904+ | — | 226.6 | — | — |

As shown in the table above, total recovery of collected fractions (fraction 1 to 13) with boiling points between 25° C. and 904° F. was 435.6 g (64.3 wt % of initial charge). Total recovery of distillation bottoms with boiling point above 904° F. was 226.6 g (33.5 wt % of initial charge). The total recovery of both distilled fractions and bottoms material amounts to 97.8 wt %. The resulting distilled fractions and distillation bottoms have narrow molecular weight distributions (Mw/Mn<1.4) as determined by GPC.

In another embodiment of the invention, the vinyl terminated macromonomer (preferably a propylene based vinyl terminated macromonomer, preferably a homopolypropylene vinyl terminated macromonomer) has less than 1 mol % regio defects (as determined by $^{13}$C NMR), based upon the total propylene monomer. Three types of defects are defined to be the regio defects: 2,1-erythro, 2,1-threo, and 3,1-isomerization. The structures and peak assignments for these are given in L. Resconi, L. Cavallo, A. Fait, and F. Piemontesi, Chem. Rev. 2000, 100, pp. 1253-1345, as well as H. N. Cheng, *Macromolecules*, 17, 1950 (1984). Alternately, the vinyl terminated macromonomer (preferably a propylene based vinyl terminated macromer, preferably a homopolypropylene vinyl terminated macromonomer) has less than 250 regio defects per 10,000 monomer units (as determined by $^{13}$C NMR), preferably less than 150, preferably less than 100, preferably less than 50 regio defects per 10,000 monomer units. The regio defects each give rise to multiple peaks in the carbon NMR spectrum, and these are all integrated and averaged (to the extent that they are resolved from other peaks in the spectrum), to improve the measurement accuracy. The chemical shift offsets of the resolvable resonances used in the analysis are tabulated below. The precise peak positions may shift as a function of NMR solvent choice.

| Regio defect | Chemical shift range (ppm) |
|---|---|
| 2,1-erythro | 42.3, 38.6, 36.0, 35.9, 31.5, 30.6, 17.6, 17.2 |
| 2,1-threo | 43.4, 38.9, 35.6, 34.7, 32.5, 31.2, 15.4, 15.0 |
| 3,1 insertion | 37.6, 30.9, 27.7 |

The average integral for each defect is divided by the integral for one of the main propylene signals (CH$_3$, CH, CH$_2$), and multiplied by 10000 to determine the defect concentration per 10000 monomers.

In another embodiment, any vinyl terminated macromonomer described herein may have a melting point (DSC first melt) of from 60° C. to 160° C., alternately 50° C. to 145° C., alternately 50° C. to 130° C., alternately 50° C. to 100° C. In another embodiment, the vinyl terminated macromonomer described herein have no detectable melting point by DSC following storage at ambient temperature (23° C.) for at least 48 hours.

In another embodiment, the vinyl terminated macromonomer described herein may have a glass transition temperature of less than 0° C. or less (DSC), preferably −10° C. or less, more preferably −20° C. or less, more preferably −30° C. or less, more preferably −50° C. or less.

Melting temperature ($T_m$) and glass transition temperature (Tg) are measured using Differential Scanning calorimetry (DSC) using commercially available equipment such as a TA Instruments 2920 DSC. Typically, 3 to 10 mg of the sample, that has been stored at 25° C. for at least 48 hours, is sealed in an aluminum pan and loaded into the instrument at 25° C. The sample is equilibrated at 25° C., then it is cooled at a cooling rate of 10° C./min to −80° C. The sample is held at −80° C. for 5 min and then heated at a heating rate of 10° C./min to 25° C. The glass transition temperature is measured from the heating cycle. Alternatively, the sample is equilibrated at 25° C., then heated at a heating rate of 10° C./min to 150° C. The endothermic melting transition, if present, is analyzed for onset of transition and peak temperature. The melting temperatures reported are the peak melting temperatures from the first heat unless otherwise specified. For samples displaying multiple peaks, the melting point (or melting temperature) is defined to be the peak melting temperature (i.e., associated with the largest endothermic calorimetric response in that range of temperatures) from the DSC melting trace.

In another embodiment, the vinyl terminated macromonomers described herein are a liquid at 25° C.

In a particularly preferred embodiment of the invention, the vinyl terminated macromonomer (preferably comprising propylene, at least 50 mol % propylene, preferably at least 70 propylene) has less than 250 regio defects per 10,000 monomer units, preferably less than 150, preferably less than 100, preferably less than 50 regio defects per 10,000 monomer units and a Tg of less than 0° C. or less (DSC), preferably −10° C. or less, more preferably −20° C. or less, more preferably −30° C. or less, more preferably −50° C. or less.

In another embodiment, the vinyl terminated macromonomers described herein have a viscosity at 60° C. of greater than 1000 cP, greater than 12,000 cP, or greater than 100,000 cP. In other embodiments, the vinyl terminated macromonomer have a viscosity of less than 200,000 cP, less than 150,000 cP, or less than 100,000 cP. Viscosity is defined as resistance to flow and the melt viscosity of neat copolymers is measured at elevated temperature using a Brookfield Digital Viscometer.

In another embodiment the VTM described herein also has a viscosity (also referred to a Brookfield Viscosity or Melt Viscosity) of 90,000 mPa·sec or less at 190° C. (as measured by ASTM D 3236 at 190° C.; ASTM=American Society for Testing and Materials); or 80,000 mPa·sec or less, or 70,000 mPa·sec or less, or 60,000 mPa·sec or less, or 50,000 mPa·sec or less, or 40,000 mPa·sec or less, or 30,000 mPa·sec or less, or 20,000 mPa·sec or less, or 10,000 mPa·sec or less, or 8,000 mPa·sec or less, or 5,000 mPa·sec or less, or 4,000 mPa·sec or less, or 3,000 mPa·sec or less, or 1,500 mPa·sec or less, or between 250 and 6,000 mPa·sec, or between 500 and 5,500 mPa·sec, or between 500 and 3,000 mPa·sec, or between 500 and 1,500 mPa·sec, and/or a viscosity of 8,000 mPa·sec or less at 160° C. (as measured by ASTM D 3236 at 160° C.); or 7,000 mPa·sec or less, or 6,000 mPa·sec or less, or 5,000 mPa·sec or less, or 4,000 mPa·sec or less, or 3,000 mPa·sec or less, or 1,500 mPa·sec or less, or between 250 and 6,000 mPa·sec, or between 500 and 5,500 mPa·sec, or between 500 and 3,000 mPa·sec, or between 500 and 1,500 mPa·sec. In other embodiments, the viscosity is 200,000 mPa·sec or less at 190° C., depending on the application. In other embodiments, the viscosity is 50,000 mPa·sec or less depending on the applications.

Process to Functionalize Polyolefins

This invention relates to a process to functionalize polyolefins comprising contacting a vinyl terminated macromonomer with a hydrohalogenating agent.

The reactants are typically combined in a reaction vessel at a temperature of −50° C. to 300° C. (preferably 25° C., preferably 150° C.). Likewise the reactants are typically combined at a pressure of 0 to 1000 MPa (preferably 0.5 to 500 MPa, preferably 1 to 250 MPa) for a residence time of 0.5 seconds to 10 hours (preferably 1 second to 5 hours, preferably 1 minute to 1 hour).

Typically, from about 0.5 to about 1.0 moles or a slight excess of the hydrohalogenation reagent are charged to the reactor per mole of VTM charged.

The process is typically a solution process, although it may be a bulk or high pressure process. Homogeneous processes are preferred. (A homogeneous process is defined to be a process where at least 90 wt % of the product is soluble in the reaction media.) A bulk homogeneous process is particularly preferred. (A bulk process is defined to be a process where reactant concentration in all feeds to the reactor is 70 vol % or more.) Alternately, no solvent or diluent is present or added in the reaction medium, (except for the small amounts used as the carrier for the catalyst or other additives, or amounts typically found with the reactants; e.g., propane in propylene).

Suitable diluents/solvents for the process include non-coordinating, inert liquids. Examples include straight and branched-chain hydrocarbons such as isobutane, butane, pentane, isopentane, hexanes, isohexane, heptane, octane, dodecane, and mixtures thereof; cyclic and alicyclic hydrocarbons such as cyclohexane, cycloheptane, methylcyclohexane, methylcycloheptane, and mixtures thereof such as can be found commercially (Isopar™); perhalogenated hydrocarbons such as perfluorinated $C_{4-10}$ alkanes, chlorobenzene, and aromatic and alkylsubstituted aromatic compounds such as benzene, toluene, mesitylene, and xylene. In a preferred embodiment, the feed concentration for the process is 60 vol % solvent or less, preferably 40 vol % or less, preferably 20 vol % or less.

The process may be batch, semi-batch or continuous. As used herein, the term continuous means a system that operates without interruption or cessation. For example, a continuous process to produce a polymer would be one where the reactants are continually introduced into one or more reactors and polymer product is continually withdrawn.

Useful reaction vessels include reactors, including continuous stirred tank reactors, batch reactors, reactive extruders, tubular reactors, pipes or pumps.

This invention further relates to a process, preferably an in-line process, preferably a continuous process, to produce functionalized polyolefins, comprising introducing macromonomer and hydrohalogenating agent(s) into a reactor, obtaining a reactor effluent containing functionalized terminated polyolefin, optionally removing (such as flashing off) solvent, unused monomer and/or other volatiles, obtaining functionalized terminated polyolefin (such as those described herein), preferably an in-line process, preferably a continuous process, to produce functionalized polyolefins, comprising introducing vinyl terminated polyolefin and a hydrohalogenating agent (as described herein) into a reaction zone (such as a reactor, an extruder, a pipe and/or a pump) and obtaining functionalized polyolefin (such as those described herein).

Halides are synthesized by the hydrohalogenation of vinyl terminated macromonomers in high yield and purity.

Hydrohalogenation Reagents

Hydrohalogenating reagents include those known to those having ordinary skill in the art and include HBr, HCl, HI, HF, and the like. They are often dissolved in another acid, such as acetic acid. For example, hydrobromic acid can be prepared in water (48% HBr in water). Gaseous hydrogen bromide can be generated from metal bromide salts and strong acid such as NaBr+ concentrated $H_2SO_4$. Hydrogen chloride is available as hydrochloric acid, gas, in 1,4-dioxane, acetic acid, diethyl ether, methanol, ethanol, 2-propanol, or 1-butanol from Sigma Aldrich Co and other commercial suppliers.

Blends of Functionalized Polyolefins

In some embodiments, the functionalized (and optionally derivitized) polyolefins produced by this invention may be blended with from 0.5 wt % to 99 wt % (typically 1.0 wt % to 98 wt %, and ideally about 50 wt % to about 98 wt %) of one or more other polymers, including but not limited to, thermoplastic polymer(s) and/or elastomer(s).

By thermoplastic polymer(s) is meant a polymer that can be melted by heat and then cooled without appreciable change in properties. Thermoplastic polymers typically include, but are not limited to, polyolefins, polyamides, polyesters, polycarbonates, polysulfones, polyacetals, polylactones, acrylonitrile-butadiene-styrene resins, polyphenylene oxide, polyphenylene sulfide, styrene-acrylonitrile resins, styrene maleic anhydride, polyimides, aromatic polyketones, or mixtures of two or more of the above. Preferred polyolefins include, but are not limited to, polymers comprising one or more linear, branched or cyclic $C_2$ to $C_{40}$ olefins, preferably polymers comprising propylene copolymerized with one or more $C_3$ to $C_{40}$ olefins, preferably a $C_3$ to $C_{20}$ alpha-olefin, more preferably $C_3$ to $C_{10}$ alpha-olefins. More preferred polyolefins include, but are not limited to, polymers comprising ethylene including but not limited to ethylene copolymerized with a $C_3$ to $C_{40}$ olefin, preferably a $C_3$ to $C_{20}$ alpha-olefin, more preferably propylene and/or butene.

By elastomers is meant all natural and synthetic rubbers, including those defined in ASTM D1566. Examples of preferred elastomers include, but are not limited to, ethylene propylene rubber, ethylene propylene diene monomer rubber, styrenic block copolymer rubbers (including SI, SIS, SB, SBS, SIBS, and the like, where S=styrene, I=isobutylene, and B=butadiene), butyl rubber, halobutyl rubber, copolymers of isobutylene and para-alkylstyrene, halogenated copolymers of isobutylene and para-alkylstyrene, natural rubber, polyisoprene, copolymers of butadiene with acrylonitrile, polychloroprene, alkyl acrylate rubber, chlorinated isoprene rubber, acrylonitrile chlorinated isoprene rubber, polybutadiene rubber (both cis and trans).

In another embodiment, the functionalized (and optionally derivitized) polyolefins produced herein may further be combined with one or more of polybutene, ethylene vinyl acetate, low density polyethylene (density 0.915 to less than 0.935 g/cm³) linear low density polyethylene, ultra low density polyethylene (density 0.86 to less than 0.90 g/cm³), very low density polyethylene (density 0.90 to less than 0.915 g/cm³), medium density polyethylene (density 0.935 to less than 0.945 g/cm³), high density polyethylene (density 0.945 to 0.98 g/cm³), ethylene vinyl acetate, ethylene methyl acrylate, copolymers of acrylic acid, polymethylmethacrylate or any other polymers polymerizable by a high-pressure free radical process, polyvinylchloride, polybutene-1, isotactic polybutene, ABS resins, ethylene-propylene rubber (EPR), vulcanized EPR, EPDM, block copolymer, styrenic block copolymers, polyamides, polycarbonates, PET resins, crosslinked polyethylene, copolymers of ethylene and vinyl alcohol (EVOH), polymers of aromatic monomers such as polystyrene, poly-1 esters, polyacetal, polyvinylidine fluoride, polyethylene glycols and/or polyisobutylene. Preferred polymers include those available from ExxonMobil Chemical Company in Baytown, Tex. under the tradenames EXCEED™ and EXACT™.

Tackifiers may be blended with the functionalized (and optionally derivitized) polyolefins produced herein and/or with blends of the functionalized (and optionally derivitized) polyolefins produced by this inventions (as described above). Examples of useful tackifiers include, but are not limited to, aliphatic hydrocarbon resins, aromatic modified aliphatic hydrocarbon resins, hydrogenated polycyclopentadiene resins, polycyclopentadiene resins, gum rosins, gum rosin esters, wood rosins, wood rosin esters, tall oil rosins, tall oil rosin esters, polyterpenes, aromatic modified polyterpenes, terpene phenolics, aromatic modified hydrogenated polycyclopentadiene resins, hydrogenated aliphatic resin, hydrogenated aliphatic aromatic resins, hydrogenated terpenes and modified terpenes, and hydrogenated rosin esters. In some embodiments the tackifier is hydrogenated. In some embodiments the tackifier has a softening point (Ring and Ball, as measured by ASTM E-28) of 80° C. to 140° C., preferably 100° C. to 130° C. The tackifier, if present, is typically present at about 1 wt % to about 50 wt %, based upon the weight of the blend, more preferably 10 wt % to 40 wt %, even more preferably 20 wt % to 40 wt %.

In another embodiment, the functionalized (and optionally derivitized) polyolefins of this invention, and/or blends thereof, further comprise typical additives known in the art such as fillers, cavitating agents, antioxidants, surfactants, adjuvants, plasticizers, block, antiblock, color masterbatches, pigments, dyes, processing aids, UV stabilizers, neutralizers, lubricants, waxes, and/or nucleating agents. The additives may be present in the typically effective amounts well known in the art, such as 0.001 wt % to 10 wt %. Preferred fillers, cavitating agents and/or nucleating agents include titanium dioxide, calcium carbonate, barium sulfate, silica, silicon dioxide, carbon black, sand, glass beads, mineral aggregates, talc, clay and the like. Preferred antioxidants include phenolic antioxidants, such as Irganox 1010, Irganox, 1076 both available from Ciba-Geigy. Preferred oils include paraffinic or naphthenic oils such as Primol 352, or Primol 876 available from ExxonMobil Chemical France, S.A. in Paris, France. More preferred oils include aliphatic naphthenic oils, white oils or the like.

In a particularly preferred embodiment, the functionalized (and optionally derivitized) polyolefins produced herein are combined with polymers (elastomeric and/or thermoplastic) having functional groups such as unsaturated molecules-vinyl bonds, ketones or aldehydes under conditions such that they react. Reaction may be confirmed by an at least 20% (preferably at least 50%, preferably at least 100%) increase in Mw as compared to the Mw of the functionalized polyolefin prior to reaction. Such reaction conditions may be increased heat (for example, above the Tm of the functionalized polyolefin), increased shear (such as from a reactive extruder), presence or absence of solvent. Conditions useful for reaction include temperatures from 150° C. to 240° C. and where the components can be added to a stream comprising polymer and other species via a side arm extruder, gravimetric feeder, or liquids pump. Useful polymers having functional groups that can be reacted with the functionalized polyolefins produced herein include polyesters, polyvinyl acetates, nylons (polyamides), polybutadiene, nitrile rubber, hydroxylated nitrile rubber. In some embodiments, the functionalized (and optionally derivitized) polyolefin of this invention may be blended with up to 99 wt % (preferably up to 25 wt %, preferably up to 20 wt %, preferably up to 15 wt %, preferably up to 10 wt %, preferably up to 5 wt %), based upon the weight of the composition, of one or more additional polymers. Suitable polymers include those described as PM 1) to PM 7) in U.S. Pat. No. 8,003,725.

Applications

The functionalized VTMs of this invention (and blends thereof as described above) may be used in any known thermoplastic or elastomer application. Examples include uses in molded parts, films, tapes, sheets, tubing, hose, sheeting, wire and cable coating, adhesives, shoe soles, bumpers, gaskets, bellows, films, fibers, elastic fibers, nonwovens, spunbonds, corrosion protection coatings and sealants. Preferred uses include additives for lubricants and/or fuels.

In some embodiments the functionalized vinyl terminated macromonomers produced herein are further functionalized (derivitized), such as described in U.S. Pat. No. 6,022,929; A. Toyota, T. Tsutsui, and N. Kashiwa, Polymer Bulletin 48, pp. 213-219, 2002; J. Am. Chem. Soc., 1990, 112, pp. 7433-7434; and U.S. Pat. No. 8,399,725.

The functionalized vinyl terminated materials prepared herein may be used in oil additivation, lubricants, fuels and many other applications. Preferred uses include additives for lubricants and or fuels.

In particular embodiments herein, the vinyl terminated macromonomers disclosed herein, or functionalized/derivitized analogs thereof, are useful as additives, preferably in a lubricant.

The functionalized VTM's and/or derivitized VTM's produced herein have uses as lubricating additives which can act as dispersants, viscosity index improvers, or multifunctional viscosity index improvers. Additionally they may be used as disinfectants (functionalized amines) and or wetting agents.

Functionalized VTMs and/or derivitized VTMs having uses as dispersants typically have Mn's g/mol) of less than 20,000, preferably less than 10,000 and most preferably less than 8,000 and typically can range from 500 to 10,000 (e.g., 500 to 5,000), preferably from 1,000 to 8,000 (e.g., 1,000 to 5,000) and most preferably from 1,500 to 6,000 (e.g., 1,500 to 3,000).

The functionalized VTMs and/or derivitized VTMs described herein having Mn's (g/mol) of greater than 10,000 g/mol, preferably greater than 10,000 to 100,000 g/mol (preferably 20,000 to 60,000 g/mol) are useful for viscosity index improvers for lubricating oil compositions, adhesive additives, antifogging and wetting agents, ink and paint adhesion promoters, coatings, tackifiers and sealants, and the like. In addition, such VTMs may be functionalized and derivitized to make multifunctional viscosity index improvers which also possess dispersant properties. (For more information please see U.S. Pat. No. 6,022,929.)

The functionalized VTMs and/or derivitized VTMs described herein may be combined with other additives (such as viscosity index improvers, corrosion inhibitor, oxidation inhibitor, dispersant, lube oil flow improver, detergents, demulsifiers, rust inhibitors, pour point depressant, antifoaming agents, antiwear agents, seal swellant, friction modifiers, and the like (described for example in U.S. Pat. No. 6,022,929 at columns 60, line 42-column 78, line 54 and the references cited therein) to form compositions for many applications, including but not limited to lube oil additive packages, lube oils, and the like.

Compositions containing these additives are typically are blended into a base oil in amounts which are effective to provide their normal attendant function. Representative effective amounts of such additives are illustrated as follows:

| Compositions | (Typical) wt %* | (Preferred) wt %* |
|---|---|---|
| V.I. Improver | 1-12 | 1-4 |
| Corrosion Inhibitor | 0.01-3 | 0.01-1.5 |
| Oxidation Inhibitor | 0.01-5 | 0.01-1.5 |
| Dispersant | 0.1-10 | 0.1-5 |
| Lube Oil Flow Improver | 0.01-2 | 0.01-1.5 |
| Detergents and Rust inhibitors | 0.01-6 | 0.01-3 |
| Pour Point Depressant | 0.01-1.5 | 0.01-1.5 |
| Anti-Foaming Agents | 0.001-0.1 | 0.001-0.01 |
| Antiwear Agents | 0.001-5 | 0.001-1.5 |
| Seal Swellant | 0.1-8 | 0.1-4 |
| Friction Modifiers | 0.01-3 | 0.01-1.5 |
| Lubricating Base Oil | Balance | Balance |

*Wt %'s are based on active ingredient content of the additive, and/or upon the total weight of any additive-package, or formulation which will be the sum of the A.I. weight of each additive plus the weight of total oil or diluent.

When other additives are employed, it may be desirable, although not necessary, to prepare additive concentrates comprising concentrated solutions or dispersions of the subject additives of this invention (in concentrate amounts hereinabove described), together with one or more of said other additives (said concentrate when constituting an additive mixture being referred to herein as an additive-package) whereby several additives can be added simultaneously to the base oil to form the lubricating oil composition. Dissolution of the additive concentrate into the lubricating oil may be facilitated by solvents and by mixing accompanied with mild heating, but this is not essential. The subject functionalized or derivitized VTMs of the present invention can be added to small amounts of base oil or other compatible solvents along with other desirable additives to form additive-packages containing active ingredients in collective amounts of typically from about 2.5% to about 90%, and preferably from about 15% to about 75%, and most preferably from about 25% to about 60% by weight additives in the appropriate proportions with the remainder being base oil.

The final formulations may employ typically about 10 wt % of the additive-package with the remainder being base oil.

In another embodiment, the vinyl terminated polyolefins described herein can be used in any process, blend or product disclosed in WO 2009/155472 or U.S. Pat. No. 6,022,929, which are incorporated by reference herein.

In a preferred embodiment, this invention relates to a fuel comprising any VTM produced herein. In a preferred embodiment, this invention relates to a lubricant comprising any VTM produced herein.

EXPERIMENTAL

Product Characterization

Products were characterized by $^1$H NMR and $^{13}$C NMR as follows.

$^1$H NMR

Unless otherwise stated, $^1$H NMR data was collected at either 25° C. or 120° C. (for purposes of the claims, 120° C. shall be used) in a 5 mm probe using a spectrometer with a $^1$H frequency of at least 400 MHz. Data was recorded using a maximum pulse width of 45° and either a 1 or 2 second delay between pulses. Typical NMR solvents such as CDCl$_3$, CD$_2$Cl$_2$, or C$_6$D$_6$ were purchased from Cambridge Isotope Laboratories or SigmaAldrich and were used at ambient temperatures in collection of the NMR data.

$^{13}$C NMR

Unless otherwise stated, $^{13}$C NMR data was collected at 120° C. using a spectrometer with a $^{13}$C frequency of at least 100 MHz. A 90 degree pulse, an acquisition time adjusted to give a digital resolution between 0.1 and 0.12 Hz, at least a 2 second pulse acquisition delay time with continuous broadband proton decoupling using swept square wave modulation without gating was employed during the entire acquisition period. The spectra were acquired with time averaging to provide a signal to noise level adequate to measure the signals of interest. Samples were dissolved in tetrachloroethane-d$_2$ (TCE) for high temperature measurements. Other solvents such as CDCl$_3$, CD$_2$Cl$_2$, or C$_6$D$_6$ were used at ambient temperatures.

All molecular weights are g/mol unless otherwise noted.

Weight-average molecular weight (Mw (GPC)), molecular weight distribution (MWD), Mw (GPC)/Mn (GPC) where Mn (GPC) is the number-average molecular weight are characterized using a Size Exclusion Chromatograph (SEC), equipped with a differential refractive index detector (DRI). Tetrahydrofuran (THF) solvent is used for the SEC experiment. The THF was then degassed with an inline degasser. Sample solutions were prepared by placing the sample in a 10 ml glass vial with solvent resistant cap, adding the desired amount of THF, then agitation for about 1 hr. All quantities were measured gravimetrically. The injection concentration is 6 mg/mL. Prior to running a sample set, the DRI detector and the injector were purged. Flow rate in the apparatus was then increased to 1.0 mL/min, and the DRI was allowed to stabilize for 1 hr. The instrument conditions are listed in Table 1. The samples are analyzed using a poly iso-butylene calibration.

The molecular weight averages were defined by considering the discontinuous nature of the distribution in which the macromolecules exist in discrete fractions i containing $N_i$ molecules of molecular weight $M_i$. The weight-average molecular weight, $M_w$, was defined as the sum of the products of the molecular weight $M_i$ of each fraction multiplied by its weight fraction $w_i$:

$$M_w = \Sigma w_i M_i = (\Sigma N_i M_i^2 / \Sigma N_i M_i)$$

since the weight fraction $w_i$ is defined as the weight of molecules of molecular weight $M_i$ divided by the total weight of all the molecules present:

$$w_i = N_i M_i / \Sigma N_i M_i.$$

The number-average molecular weight, $M_n$, is defined as the sum of the products of the molecular weight $M_i$ of each fraction multiplied by its mole fraction $x_i$:

$$M_n = \Sigma x_i M_i = N_i M_i / \Sigma N_i$$

since the mole fraction $x_i$ is defined as $N_i$ divided by the total number of molecules:

$$x_i = N_i / \Sigma N_i.$$

GPC Conditions

| INSTRUMENT# 31 | | Waters Alliance 2690 HPLC |
|---|---|---|
| COLUMN | Type: | 3 Mixed Bed type "D" 5µ particles |
| | Length: | 300 mm |
| | ID: | 7.5 mm |
| | Supplier: | Polymer Laboratories |
| SOLVENT PROGRAM | Type: | 100% tetrahydrofuran un-inhibited (THF) |
| | Flow Rate: | 1 ml./min. |

| DETECTOR | A: | Waters 486 tunable UV @ 254 nm. λ |
| --- | --- | --- |
| | B: | Waters 2410 Refractive Index |
| TEMPERATURE | Injector: | Ambient ~23° C. |
| | Detector: | Ambient ~23° C. |
| | Column's: | Ambient ~23° C. |
| INJECTION VOLUME | | 100 µl |
| SAMPLE CONCENTRATION | | 0.6 w/v % (6 mg./ml.) |
| SOLVENT DILUENT | | THF |

Example 1

Unless specified otherwise, all reagents and solvents were used as received. Vinyl-terminated atactic homopolypropylene macromer A, free from low-boiling materials, was obtained as a colorless liquid after volatiles had been removed from as-received macromonomer sample by heating at 85° C. to 100° C. under vacuum for several hours. Mn's of vinyl terminated macromonomers were determined by $^1$H NMR in CDCl$_3$.

Vinyl Terminated Macromers used were made as previously as disclosed in U.S. Pat. No. 8,318,998 and/or U.S. Pat. No. 8,455,597, which are incorporated by reference in its entirety herein.

Vinylidene aPP was similarly synthesized using the catalyst system composed of a 1 to 1 molar amount of (CpHMe$_4$)(CpH$_4$n-propyl)ZrMe$_2$ and dimethylanilinium tetrakisperfluoronaphthylborate.

Anhydrous solvents such as toluene were purchased from Aldrich and dried over 3 A sieves. Dimethylanilinium tetrakisperfluoronaphthylborate was purchased from Grace-Davison. (CpHMe$_4$)(CpH$_4$n-propyl)ZrMe$_2$ was purchased from Boulder.

Starting Materials aPP-VTM (Macromer A), $M_n$=486 by $^1$H NMR, Vinyls=97%, GPC ($M_w$=874, $M_n$=499, $M_w/M_n$=1.75)

C$_3$C$_4$-VTM (Macromer B), $M_n$=1062 by $^1$H NMR, Vinyls=95%, C$_4$=36 mol % by $^{13}$C NMR, GPC ($M_w$=2197, $M_n$=1030, $M_w/M_n$=2.13)

aPP-VTM (Macromer C), $M_n$=1866 by $^1$H NMR, Vinyls=97%, GPC ($M_w$=4789, $M_n$=2289, $M_w/M_n$=2.09)

C$_2$C$_3$-VTM (Macromer D), $M_n$=20831 by $^1$H NMR, Vinyls=62%

C$_3$C$_6$-VTM (Macromer E), $M_n$=1567 by $^1$H NMR, Vinyls=89%, C$_6$=46 mol % by $^{13}$C NMR, GPC ($M_w$=3143, $M_n$=1488, $M_w/M_n$=2.11)

aPP-VTM (Macromer F), $M_n$=1016 by $^1$H NMR, Vinyls=92%, GPC ($M_w$=2387, $M_n$=1069, $M_w/M_n$=2.23)

aPP-VTM (Macromer G), $M_n$=307 by $^1$H NMR, Vinyls=97%, GPC ($M_w$=290, $M_n$=285, $M_w/M_n$=1.02)

aPP-VTM (Macromer H), $M_n$=159 by $^1$H NMR, Vinyls=97%, GPC ($M_w$=184, $M_n$=175, $M_w/M_n$=1.05)

C$_3$C$_6$-VTM (Macromer I) $M_n$=2307 by $^1$H NMR, vinyls=95%, C$_6$ content=43 mol % by $^{13}$C NMR aPP-VTM (Macromer J) $M_n$=2108, Vinyls=97%

C$_3$C$_4$-VTM (Macromer K) $M_n$=2105 Vinyls=87.5%, C$_4$=47.6 mol % by $^{13}$C NMR C$_3$C$_6$-VTM (Macromer L) $M_n$=2215, Vinyls=82%, C$_6$ content 45.2 mol % by $^{13}$C NMR C$_3$-VTM (Macromer M) $M_n$=1600, Vinyls=92%

HR-PIB (BASF Glissopal 1000), Vinylidene-80-85%, GPC ($M_w$=1765, $M_n$=920, $M_w/M_n$=1.92)

Vinylidene aPP (Polymer N), $M_n$=2272 by $^1$H NMR, Vinylidene=95%, GPC ($M_w$=4475, $M_n$=2256, $M_w/M_n$=1.98)

Example 2

Preparation of Bromo-Terminated Atactic C$_3$ Macromer C$_3$—CH$_2$—CH$_2$—Br (1)

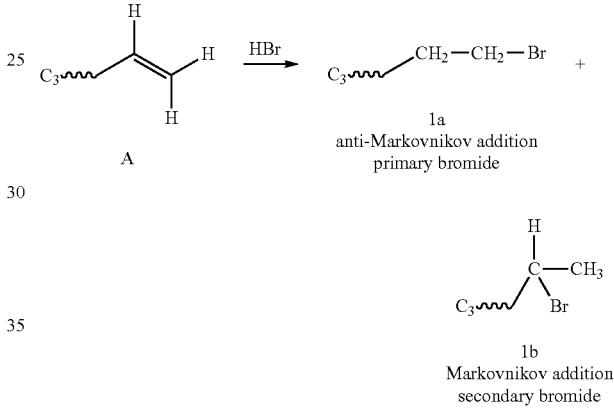

To a solution of vinyl-terminated atactic C$_3$ macromer A ($M_n$ 486 g/mol by $^1$H NMR, 5.00 g, 10.29 mmol) in hexanes (4 ml) cooled to −10° C. was added dropwise 33 wt % hydrogen bromide solution in acetic acid (3.06 ml, 16.8 mmol). After complete addition of the HBr solution, the mixture was stirred at −10° C. for an additional 20 minutes. Ice-cold water (20 ml) was added to the mixture and the aqueous phase was extracted with hexanes. The organic extract was washed with water (2×50 ml), dried over MgSO$_4$, filtered and concentrated on a rotary evaporator to give a light yellow liquid product. The crude product was further purified by heating at 60° C. to 65° C. under high vacuum to afford a clear liquid (5.73 g). $^1$H NMR supported the assignment of a primary bromide structure. $^1$H NMR (400 MHz, CDCl$_3$): δ (ppm) 4.20 (—C$\underline{H}$BrCH$_3$, br, 0.03H, product 1b), 3.86 (br, 0.03H) 3.39 (—C$\underline{H}_2$—Br, t, J=8.0 Hz, 2.0H, product 1a), 1.87-1.78 (—C$\underline{H}_2$CH$_2$—Br, m, 2.4H), 1.71-1.36 (m, 13.3H), 1.35-1.23 (m, 5.4H), 1.23-0.94 (m, 19.9H), 0.94-0.5 (m, 44.2H). $^{13}$C NMR (100 MHz, CDCl$_3$): δ (ppm) 47.8-43.7 (m), 36.8-34.9 (m), 34.2 (—$\underline{C}$H$_2$—Br, s), 30.5-29.4 (m, —$\underline{C}$H$_2$CH$_2$—Br), 27.6-26.9 (m), 25.2-25.1 (m, —$\underline{C}$H(CH$_3$)$_2$), 24.8-23.4 (m), 22.6-21.9 (m), 21.5-19.0 (m). Elemental analysis: C, 72.78%; H, 12.58%; Br, 14.72%. GPC ($M_w$=809, $M_n$=473, $M_w/M_n$=1.71).

Example 3

Preparation of Bromo-Terminated $C_3C_4$ Macromer
$C_3C_4$—$CH_2$—$CH_2$—Br (2)

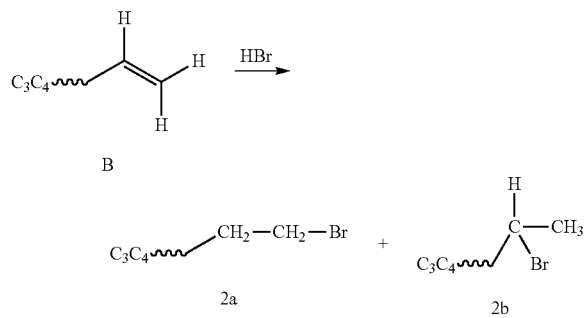

To a solution of vinyl-terminated $C_3C_4$ macromer B ($M_n$ 1062 g/mol by $^1$H NMR, 40.00 g, 37.66 mmol) in hexanes (50 ml) cooled to –10° C. was added dropwise a mixture of 33 wt % hydrogen bromide solution in acetic acid (13.18 ml, 72.5 mmol) and hexanes (10 ml) from an addition funnel over 15 min. After complete addition of the HBr solution, the mixture was stirred between 0° C. to 10° C. for an additional 1.75 hours. Ice-cold water (100 ml) was added to the mixture and the aqueous phase was extracted with hexanes (30 ml). The organic extract was washed with water (2×150 ml), dried over MgSO$_4$, filtered and concentrated on a rotary evaporator to give a clear and light yellow liquid product. The crude product was further purified by heating at 60° C. to 65° C. under high vacuum to afford a clear liquid (40.90 g). $^1$H NMR supported the assignment of a primary bromide structure. $^1$H NMR (400 MHz, CDCl$_3$): δ (ppm) 4.20 (—C$\underline{H}$BrCH$_3$, br, 0.10H, product 2b), 3.86 (br, 0.03H) 3.39 (—C$\underline{H}_2$—Br, t, J=8.0 Hz, 2.0H, product 2a), 1.89-1.78 (—C$\underline{H}_2$CH$_2$—Br, m, 2.3H), 1.73-1.48 (m, 14.8H), 1.48-1.22 (m, 26.0H), 1.22-0.91 (m, 44.3H), 0.91-0.55 (m, 73.0H). $^{13}$C NMR (100 MHz, CDCl$_3$): δ (ppm) 47.9-43.7 (m), 43.6-41.0 (m), 39.7-38.1 (m), 36.9-34.7 (m), 34.3-32.9 (m), 32.5-31.5 (m), 30.8-28.9 (m), 27.4 (s), 27.0-25.2 (m), 23.9-22.1 (m), 21.6-19.0 (m), 11.7-11.2 (m), 11.1-9.8 (m). Elemental analysis: C, 78.83%; H, 13.39%; Br, 7.55%. GPC ($M_w$=2039, $M_n$=924, $M_w/M_n$=2.21). See FIG. 1 for the $^1$H NMR spectrum of the product 2.

Example 4

Preparation of Bromo-Terminated Atactic $C_3$ Macromer $C_3$—$CH_2$—$CH_2$—Br (3)

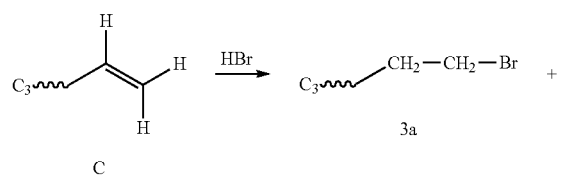

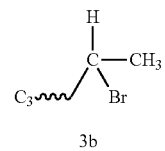

To a solution of vinyl-terminated atactic $C_3$ macromer C ($M_n$ 1866 g/mol by $^1$H NMR, 60.00 g, 32.16 mmol) in hexanes (50 ml) cooled to –10° C. was added dropwise a mixture of 33 wt % hydrogen bromide solution in acetic acid (11.25 ml, 61.9 mmol) and hexanes (10 ml) from an addition funnel over 20 minutes. After complete addition of the HBr solution, the mixture was stirred at –10° C. for an additional 20 minutes and then at 0° C. for 1.5 hours. Ice-cold water (150 ml) was added to the mixture and the aqueous phase was extracted with hexanes (80 ml). The organic extract was washed with water (2×150 ml), dried over MgSO$_4$, filtered and concentrated on a rotary evaporator to give a clear and colorless liquid product. The crude product was further purified by heating at 60° C. to 65° C. under high vacuum to afford a clear liquid (59.65 g). $^1$H NMR supported the assignment of a primary bromide structure. $^1$H NMR (400 MHz, CDCl$_3$): δ (ppm) 4.20 (—C$\underline{H}$BrCH$_3$, br, 0.04H, product 3b), 3.86 (br, 0.01H) 3.39 (—C$\underline{H}_2$—Br, t, J=8.0 Hz, 2.0H, product 3a), 1.95-1.79 (—C$\underline{H}_2$CH$_2$—Br, m, 2.3H), 1.78-1.48 (m, 45.8H), 1.48-0.91 (m, 84.0H), 0.91-0.55 (m, 146.8H). $^{13}$C NMR (100 MHz, CDCl$_3$): δ (ppm) 48.0-43.8 (m), 36.8-36.2 (m), 35.6-34.9 (m), 34.0 (—C$\underline{H}_2$—Br, s), 30.7-30.4 (m), 29.7-29.5 (m), 27.9-27.1 (m), 25.3-25.2 (m), 23.9-23.3 (m), 22.7-22.1 (m), 21.6-19.1 (m). Elemental analysis: C, 82.06%; H, 13.84%; Br, 4.20%. GPC ($M_w$=4544, $M_n$=1978, $M_w/M_n$=2.30).

Example 5

Preparation of Bromo-Terminated $C_2C_3$ Macromer $C_2C_3$—$CH_2$—$CH_2$—Br (4)

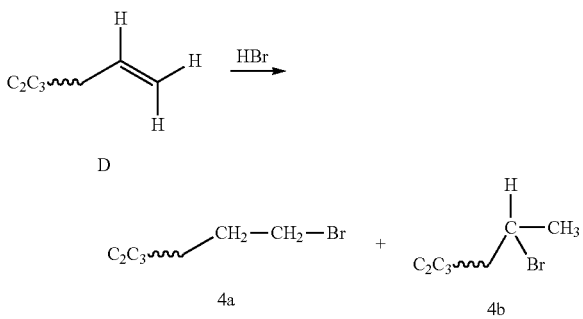

To a solution of vinyl-terminated $C_2C_3$ macromer D ($M_n$ 20831 g/mol by $^1$H NMR, 6.66 g, 0.32 mmol) in hexanes (45 ml) cooled to 0° C. was added dropwise 33 wt % hydrogen bromide solution in acetic acid (0.256 ml, 1.41 mmol) over 5 minutes. After complete addition of the HBr solution, the mixture was stirred between 0° C. to 10° C. for an additional 70 minutes. Ice-cold water (40 ml) was added to the mixture and the aqueous phase was extracted with hexanes (25 ml). The organic extract was washed with water (2×40 ml), dried over MgSO$_4$, filtered and concentrated on a rotary evaporator to give a clear and light brown viscous liquid product. The crude product was further purified by heating at 60° C. to 65° C. under high vacuum to afford a clear liquid (6.61 g). $^1$H NMR supported the assignment of a primary bromide structure. $^1$H NMR (400 MHz, CDCl$_3$): δ (ppm) 4.84 (br, 0.38H), 3.86 (m, 0.4H), 3.49-3.46 (m, 0.4H) 3.39 (—C$\underline{H}_2$—Br, t, J=8.0 Hz, 2.0H), 1.95-1.80 (—C$\underline{H}_2$CH$_2$—Br, m, 2.5H), 1.79-1.52 (br, 249.3H), 1.52-1.42 (br, 182.2H), 1.42-1.13 (br, 1034.9H), 1.13-0.94 (m, 652.8H), 0.93-0.55 (1606.7H). $^{13}$C NMR (100 MHz, CDCl$_3$): δ (ppm) 47.4-44.0 (m), 38.8-37.8 (m), 37.8-36.5 (m), 32.8 (s), 30.6-29.7 (m), 27.8-26.8 (m), 24.7-24.0 (m), 21.6-19.1 (m). Elemental analysis: C, 84.79%; H, 14.21%; Br, 0.65%. GPC (M$_w$=37135, M$_n$=16547, M$_w$/M$_n$=2.24).

Example 6

Preparation of Bromo-Terminated C$_3$C$_6$ Macromer C$_3$C$_6$—CH$_2$—CH$_2$—Br (5)

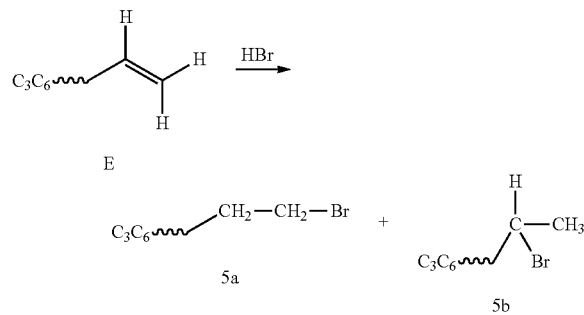

To a solution of vinyl-terminated C$_3$C$_6$ macromer E (M$_n$ 1567 g/mol by $^1$H NMR, 40.00 g, 25.52 mmol) in hexanes (50 ml) cooled to −10° C. was added dropwise a mixture of 33 wt % hydrogen bromide solution in acetic acid (8.93 ml, 49.1 mmol) and hexanes (10 ml) from an addition funnel over 40 min. After complete addition of the HBr solution, the mixture was stirred between 0° C. to 10° C. for an additional 80 minutes. Ice-cold water (100 ml) was added to the mixture and the aqueous phase was extracted with hexanes (60 ml). The organic extract was washed with water (2×150 ml), dried over MgSO$_4$, filtered and concentrated on a rotary evaporator to give a clear and pale yellow liquid product. The crude product was further purified by heating at 60° C. to 65° C. under high vacuum to afford a clear liquid (41.19 g). $^1$H NMR supported the assignment of a primary bromide structure. $^1$H NMR (400 MHz, CDCl$_3$): δ (ppm) 3.39 (—C$\underline{H}_2$—Br, t, J=8.0 Hz, 2.0H), 1.95-1.78 (—C$\underline{H}_2$CH$_2$—Br, m, 2.3H), 1.71-1.48 (m, 22.6H), 1.48-1.34 (br, 15.0H), 1.34-1.10 (m, 98.5H), 1.10-0.96 (33.9H), 0.95-0.87 (53.5H), 0.87-0.55 (m, 48.2H). $^{13}$C NMR (100 MHz, CDCl$_3$): δ (ppm) 48.0-44.4 (m), 44.2-41.7 (m), 40.7-39.2 (m), 35.0-32.8 (m), 32.8-31.8 (m), 30.7-29.1 (m), 29.1-27.9 (m), 27.9-27.2 (m), 23.7-22.8 (m), 21.6-19.1 (m), 14.3 (s). Elemental analysis: C, 80.65%; H, 13.66%; Br, 5.38%. GPC (M$_w$=3004, M$_n$=1407, M$_w$/M$_n$=2.14).

Example 7

Preparation of Bromo-Terminated Atactic C$_3$ Macromer C$_3$—CH$_2$—CH$_2$—Br (6)

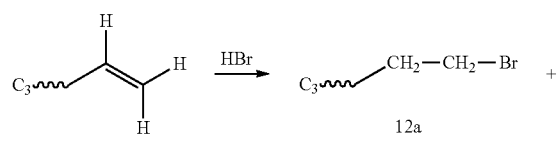

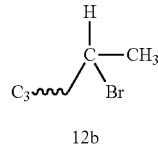

To a solution of vinyl-terminated atactic C$_3$ macromer F (M$_n$ 1016 g/mol by $^1$H NMR, 91.74 g, 90.32 mmol) in hexanes (130 ml) cooled to 0° C. was added dropwise a mixture of 33 wt % hydrogen bromide solution in acetic acid (28.90 ml, 159.0 mmol) and hexanes (20 ml) from an addition funnel over 30 minutes. After complete addition of the HBr solution, the mixture was stirred at 0° C. for an additional 75 minutes. Ice-cold water (300 ml) was added to the mixture and the aqueous phase was extracted with hexanes (150 ml). The organic extract was washed with water (2×250 ml), dried over MgSO$_4$, filtered and concentrated on a rotary evaporator to give a clear and pale yellow liquid product. The crude product was further purified by heating at 60° C. to 65° C. under high vacuum to afford a clear liquid (96.13 g). $^1$H NMR supported the assignment of a primary bromide structure. $^1$H NMR (400 MHz, CDCl$_3$): δ (ppm) 4.20 (—C$\underline{H}$BrCH$_3$, br, 0.06H, product 6b), 4.00 (br, 0.06H), 3.86 (br, 0.06H) 3.39 (—C$\underline{H}_2$—Br, t, J=8.0 Hz, 2.0H, product 6a), 2.09-2.15 (br, 0.06H), 1.95-1.76 (—C$\underline{H}_2$CH$_2$—Br, m, 2.5H), 1.76-1.33 (m, 26.8H), 1.33-0.91 (m, 45.7H), 0.91-0.62 (m, 79.8H). $^{13}$C NMR (100 MHz, CDCl$_3$): δ (ppm) 48.0-42.5 (m), 36.8-36.2 (m), 35.6-35.0 (m), 34.0, 33.8 (—C$\underline{H}_2$—Br, s), 30.7-30.4 (m), 30.3-29.7 (m), 29.7-29.5 (m), 27.9-27.1 (m), 25.3-25.2 (m), 23.9-23.3 (m), 22.7-22.1 (m), 21.6-19.2 (m). Elemental analysis: C, 78.80%; H, 13.34%; Br, 7.51%. GPC (M$_w$=2228, M$_n$=994, M$_w$/M$_n$=2.24).

Example 8

Preparation of Bromo-Terminated Atactic C$_3$ Macromer C$_3$—CH$_2$—CH$_2$—Br (7) from Atactic C$_3$ Distilled Fraction Macromer G (Polydispersity Index, Mw/Mn=1.02)

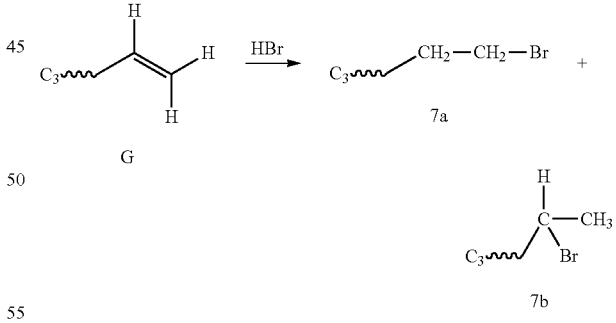

To a solution of vinyl-terminated atactic C$_3$ distilled fraction macromer G (M$_n$ 307 g/mol by $^1$H NMR, 6.0 g, 19.56 mmol) in hexanes (9 ml) cooled to −10° C. was added dropwise 33 wt % hydrogen bromide solution in acetic acid (5.53 ml, 30.4 mmol). After complete addition of the HBr solution, the mixture was stirred between −10° C. and −8° C. for an additional 30 minutes. Ice-cold water (60 ml) was added to the mixture and the aqueous phase was extracted with hexanes (30 ml). The combined organic extract was washed with water, aqueous sodium carbonate solution, brine, dried over MgSO$_4$, filtered and concentrated on a rotary evaporator to give a clear and light yellow liquid product (7.45 g). $^1$H NMR supported the assignment of a primary bromide structure. $^1$H NMR (400 MHz, CDCl$_3$): δ (ppm) 4.20 (—C$\underline{H}$BrCH$_3$, br, 0.05H, product 7b), 4.00 (br, 0.04H), 3.86 (br, 0.04H), 3.39 (—C$\underline{H}_2$—Br, t, J=8.0 Hz, 2.0H, product 7a), 1.95-1.75 (—C$\underline{H}_2$CH$_2$—Br, m, 2.3H), 1.75-1.49 (m, 6.0H), 1.49-1.31 (m, 2.1H), 1.31-0.91 (m, 12.0H), 0.91-0.62 (m, 23.2H). $^{13}$C NMR (100 MHz, CDCl$_3$): δ (ppm) 47.9-41.8 (m), 36.6-36.0 (m), 35.8-34.9 (m), 34.2 (s), 34.1 (—C$\underline{H}_2$—Br, s), 33.2-31.5 (m), 30.6-29.4 (m), 27.8-27.0 (m), 25.3-25.1 (m), 23.9-21.9 (m), 21.3-19.2 (m). Elemental analysis: C, 65.42%; H, 11.37%; Br, 22.81%.

Preparation of Bromo-Terminated Atactic C$_3$ Macromer C$_3$—CH$_2$—CH$_2$—Br (8) from Atactic C$_3$ Distilled Fraction Macromer H (Polydispersity Index, Mw/Mn=1.05)

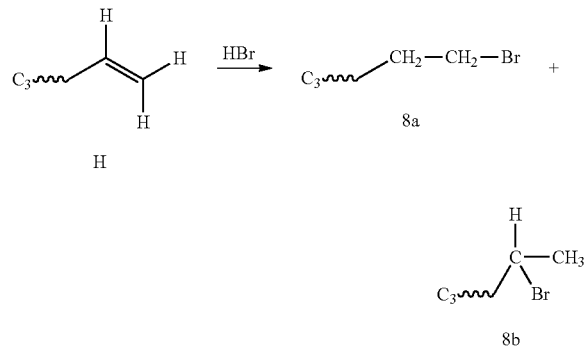

To a solution of vinyl-terminated atactic C$_3$ distilled fraction macromer H (M$_n$ 159 g/mol by $^1$H NMR, 4.0 g, 25.11 mmol) in hexanes (12 ml) cooled to −10° C. was added dropwise 33 wt % hydrogen bromide solution in acetic acid (6.82 ml, 37.5 mmol). After complete addition of the HBr solution, the mixture was stirred between −10° C. and −8° C. for an additional 30 minutes. Ice-cold water (80 ml) was added to the mixture and the aqueous phase was extracted with hexanes. The combined organic extract was washed with water, aqueous sodium carbonate solution, brine, dried over MgSO$_4$, filtered and concentrated on a rotary evaporator to give a clear and light yellow liquid product (5.46 g). $^1$H NMR supported the assignment of a primary bromide structure. $^1$H NMR (400 MHz, CDCl$_3$): δ (ppm) 4.20 (—C$\underline{H}$BrCH$_3$, br, 0.04H, product 8b), 4.00 (br, 0.03H), 3.86 (br, 0.02H) 3.39 (—C$\underline{H}_2$—Br, t, J=8.0 Hz, 2.0H, product 8a), 1.95-1.75 (—C$\underline{H}_2$CH$_2$—Br, m, 2.2H), 1.75-1.59 (m, 1.3H), 1.59-1.46 (m, 1.7H), 1.46-1.31 (m, 1.2H), 1.31-1.16 (m, 1.3H), 1.16-0.92 (3.3H), 0.91-0.62 (m, 11.8H). $^{13}$C NMR (100 MHz, CDCl$_3$): δ (ppm) 47.53 (s), 46.66 (s), 46.54 (s), 45.82 (s), 45.45 (s), 45.42 (s), 44.88 (s), 44.77 (s), 43.98 (s), 36.32 (s), 35.78 (s), 35.23 (s), 34.22 (s), 34.05 (—C$\underline{H}_2$—Br, s), 30.49 (s), 30.42 (s), 30.36 (s), 29.72 (s), 29.65 (s), 29.53 (s), 29.46 (s), 29.42 (s), 29.36 (s), 27.55 (s), 27.50 (s), 27.43 (s), 27.4-27.2 (m), 25.15 (s), 25.08 (s), 23.66 (s), 23.63 (s), 23.38 (s), 23.32 (s), 23.23 (s), 23.17 (s), 23.05 (s), 22.74 (s), 22.48 (s), 22.45 (s), 22.39 (s), 22.32 (s), 22.23 (s), 22.11 (s), 22.05 (s), 20.32 (s), 20.16 (s), 20.12 (s), 20.08-20.06 (m), 19.65 (s), 19.50 (s), 19.37 (s). Elemental analysis: C, 54.66%; H, 9.52%; Br, 35.85%.

Example 10

Preparation of Bromo-Terminated Atactic C$_3$ Macromer C$_3$—CH$_2$—CH$_2$—Br (9)

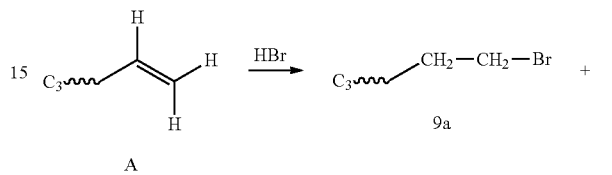

To a solution of vinyl-terminated atactic C$_3$ macromer A (M$_n$ 486 g/mol by $^1$H NMR, 5.00 g, 10.29 mmol) in hexanes (4 ml) at 25° C. was added dropwise 33 wt % hydrogen bromide solution in acetic acid (2.79 ml, 15.3 mmol). After complete addition of the HBr solution, the mixture was stirred at 25° C. for an additional 20 minutes. Water (20 ml) was added to the mixture at 25° C. and the aqueous phase was extracted with hexanes. The combined organic extract was washed with water, aqueous sodium carbonate solution, brine, dried over MgSO$_4$, filtered and concentrated on a rotary evaporator to give a clear and colorless liquid product (5.54 g). $^1$H NMR supported the assignment of a primary bromide structure. $^1$H NMR (400 MHz, CDCl$_3$): δ (ppm) 4.20 (—C$\underline{H}$BrCH$_3$, br, 0.08H, product 9b), 3.86 (br, 0.08H) 3.39 (—C$\underline{H}_2$—Br, t, J=8.0 Hz, 2.0H, product 9a), 1.95-1.77 (—C$\underline{H}_2$CH$_2$—Br, m, 2.4H), 1.76-1.32 (m, 13.9H), 1.39-0.90 (m, 21.2H), 0.90-0.55 (m, 41.1H). $^{13}$C NMR (100 MHz, CDCl$_3$): δ (ppm) 48.0-43.7 (m), 36.8-36.4 (m), 36.3-36.1 (m), 35.7-35.3 (m), 35.2-34.9 (m), 33.9 (—C$\underline{H}_2$—Br, s), 30.7-30.4 (m), 29.7-29.4 (m), 27.8-27.0 (m), 25.3-25.2 (m), 24.9-23.3 (m), 22.6-22.0 (m), 21.6-19.1 (m). Elemental analysis: C, 72.71%; H, 12.42%; Br, 15.00%.

Example 11

Preparation of C$_3$C$_6$—Br (10)

C$_3$C$_6$-VTM macromer I (M$_n$=2307, 40.4 g) was dissolved in hexane (60 ml) and cooled to 0° C. A solution of HBr (7.0 ml, 33 wt % in acetic acid) was slowly added during a 15 minute time interval. An aliquot at 3 hours of reaction time indicated that all vinyl end groups were consumed. The reaction mixture was transferred to a separatory funnel and washed with H$_2$O (3×100 ml). The volatiles were removed from the organic layer and the product dried in a vacuum oven at 80° C. for 12 hours (38.0 g). $^1$H NMR (500 MHz, CDCl$_3$): δ (ppm) 3.46 (t, 1H), 2.0-0.5 (m, 211.7H). $^{13}$C NMR (125 MHz, CDCl$_3$): δ (ppm) 34.4 (—C$\underline{H}_2$—Br, s, overlaps with other resonances) 30.8 (m, —C$\underline{H}_2$CH$_2$—Br, 1.0C), 25.6 (m, —C$\underline{H}$(CH$_3$)$_2$, 1.2C).

Example 12

Preparation of aPP-Br (11)

aPP-VTM macromer J ($M_n$=2108, 91 g) was dissolved in hexane (100 ml) and cooled to 0° C. A solution of HBr (17 ml, 33 wt % in acetic acid) was added by addition funnel over a 30 minute time period. An aliquot at 2 hours of reaction time indicated the disappearance of all vinyl chain ends. The crude reaction was washed with $H_2O$ (3×200 ml) and volatiles were removed. The product was dried in a vacuum oven at 70° C. for 12 hours. A foaming problem occurred while drying this particular product which resulted in a reduced yield (65.4 g). $^1$H NMR (500 MHz, $CDCl_3$): δ (ppm) 3.35 (m, —C$\underline{H}_2$—Br, 1.0H), 1.87 (m, —C$\underline{H}_2$—$CH_2$—Br, 0.91H), 1.76-0.40 (m, 164.9H). There are additional peaks at 4.18 (0.02H) and 3.94 (m, 0.01H) most likely due to addition of HBr to form secondary bromide. $^{13}$C NMR (125 MHz, $CDCl_3$): δ (ppm) 34.0 (—$\underline{C}H_2$—Br, s, 1.0C), 30.9 (m, —$\underline{C}H_2$—$CH_2$—Br, 0.90C), 25.45 (m, —$\underline{C}H(CH_3)_2$, 1.10C). Elemental analysis: C, 81.4%; H, 13.7%; Br, 2.4%.

Example 13

Preparation of $C_3C_4$—Br (12)

Similarly, this product was prepared with $C_3C_4$-VTM macromer K ($M_n$=2105, 76 g) and HBr solution (14.3 ml, 33 wt % in acetic acid) for a yield of 40.3 g. Some loss of product occurred while drying.

Example 14

Preparation of $C_3C_6$—Br (13)

Similarly, this product was prepared with $C_3C_6$-VTM macromer L ($M_n$=2215, 114.5 g) and HBr solution (20.3 ml, 33 wt % in acetic acid) for a yield of 96.3 g. $^1$H NMR (500 MHz, $CDCl_3$): δ (ppm) 3.37 (t, —C$\underline{H}_2$—Br, 1H), 2.25-0.5 (m, 275.1H).

Example 15

Preparation of $C_3C_6$—Br (14)

Similarly, this product was prepared with $C_3C_6$-VTM macromer L ($M_n$=2215, 54.2 g) and HBr solution (10 ml, 33 wt % in acetic acid) for a yield of 41.2 g. $^1$H NMR (500 MHz, $CDCl_3$): δ (ppm) 3.37 (t, 1H), 2.25-0.5 (m, 275.1H).

Example 16

Preparation of $C_3$—Br (15)

Similarly, this product was prepared with $C_3$-VTM macromer M ($M_n$=1600, 136 g) and HBr solution (34 ml, 33 wt % in acetic acid) for a yield of 132.5 g. $^1$H NMR (500 MHz, $CDCl_3$): δ (ppm) 4.1 (br s, 0.02H) and 3.9-3.75 (m, 0.03H), 3.22 (t, 1H), 2.25-0.5 (m, 154.1H).

Example 17

Preparation of Bromo-Terminated Polyisobutylene (16) from Highly Reactive Polyisobutylene (Glissopal 1000)

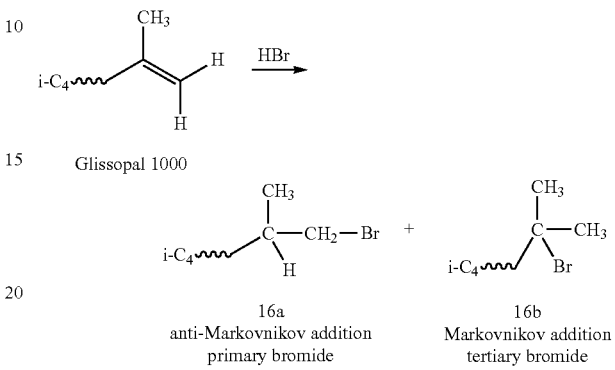

16a
anti-Markovnikov addition
primary bromide

16b
Markovnikov addition
tertiary bromide

To a solution of predominately vinylidene-terminated polyisobutylene (Glissopal 1000 from BASF, 50.00 g) in hexanes (50 ml) cooled to −8° C. was added dropwise a mixture of 33 wt % hydrogen bromide solution in acetic acid (18.62 ml, 93.1 mmol) and hexanes (10 ml) from an addition funnel over 15 minutes. After complete addition of the HBr solution, the mixture was stirred at between −8° C. to 0° C. for an additional 1.5 hours. Ice-cold water (150 ml) was added to the mixture and the aqueous phase was extracted with hexanes (80 ml). The organic extract was washed with water (2×200 ml), dried over $MgSO_4$, filtered and concentrated on a rotary evaporator to give a clear and pale yellow liquid as crude product. The crude product was further purified by heating at 60° C. to 65° C. under high vacuum to afford a clear liquid (52.20 g). $^1$H NMR (400 MHz, $CDCl_3$): δ (ppm) 4.04-4.03 (m, 0.1H), 3.42-3.39 (dd, 1.0H), 3.29-3.25 (dd, 1.0H), 1.97-1.85 (m, 1.3H), 1.84-1.63 (br, 1.0H), 1.61-1.51 (m, 2.7H), 1.49-1.36 (m, 36.0H), 1.36-1.29 (br, 5.6H), 1.29-1.05 (m, 119.3H), 1.04-0.94 (m, 22.9H), 0.94-0.73 (m, 1.8H). $^{13}$C NMR (100 MHz, $CDCl_3$): δ (ppm) 59.5 (s), 59.4-59.3 (m), 58.89 (s), 58.28 (s), 56.83 (s), 51.23 (s), 43.41 (s), 38.20 (s), 38.14 (s), 37.93 (s), 37.83 (s), 35.90 (s), 32.64 (s), 32.59 (s), 32.54 (s), 31.62 (s), 31.37 (s), 31.30 (s), 31.17 (s), 30.92 (s), 29.32 (s), 29.15 (s), 22.16 (s). Elemental analysis: C, 79.59%; H, 13.17%; Br, 7.39%. GPC ($M_w$=1691, $M_n$=909, $M_w/M_n$=1.86).

Example 18

Preparation of Bromo-Terminated Atactic Polypropylene (17) from Vinylidene-Terminated Polypropylene N

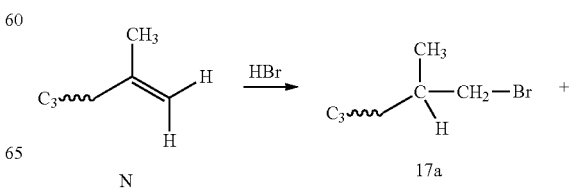

-continued

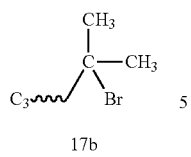

17b

To a solution of vinylidene-terminated atactic polypropylene N ($M_n$ 2272 g/mol by $^1$H NMR, 6.85 g, 3.02 mmol) in hexanes (24 ml) cooled to 0° C. was added dropwise 33 wt % hydrogen bromide solution in acetic acid (1.06 ml, 5.3 mmol) over 3 minutes. After complete addition of the HBr solution, the mixture was stirred at 0° C. for 30 minutes and then at 5° C. for 2 hours. Ice-cold water (65 ml) was added to the mixture and the aqueous phase was extracted with hexanes (10 ml). The combined organic extract was washed with water (75 ml) and half-saturated brine (10 ml), dried over MgSO$_4$, filtered and concentrated on a rotary evaporator to give a slightly cloudy and pale yellow liquid as crude product (6.84 g). $^1$H NMR (400 MHz, CDCl$_3$): δ (ppm) 3.87 (br, 0.1H), 3.80 (br, 0.08H), 3.53-3.26 (m, 2.0H), 2.17-1.82 (m, 2.0H), 1.82-1.42 (m, 57.0H), 1.42-1.23 (m, 31.1H), 1.23-0.52 (m, 276.8H). $^{13}$C NMR (100 MHz, CDCl$_3$): δ (ppm) 47.5-43.2 (m), 42.8-42.2 (m), 42.0-41.8 (m), 41.5-41.2 (m), 40.8-40.2 (m), 39.6-38.8 (m), 33.1-32.7 (m), 32.5-32.3 (m), 27.8-27.2 (m), 21.6-19.2 (m), 14.6-14.5 (m). Elemental analysis: C, 80.95%; H, 13.73%; Br, 4.17%. GPC ($M_w$=4294, $M_n$=2095, $M_w/M_n$=2.05).

Example 19

Reaction of C$_3$-Vinylidene with HBr (18)

C$_3$-Vinylidene N (15.5 g) was dissolved in hexane (100 ml) and cooled to 0° C. A solution of HBr (6.8 ml, 33 wt % in acetic acid) was added over 15 minutes. The reaction was stirred and warmed to ambient temperatures over 2.5 hours and the reaction mixture subjected to the usual aqueous work-up as described above. The product was dried in a vacuum oven at 70° C. for 12 hours (14.5 g). $^1$H NMR (500 MHz, CDCl$_3$): δ (ppm) 3.6-3.0 (m, 1.0H), 2.5-0.5 (m, 168.8H). There are additional peaks at 4.72 to 4.5 (m, 0.03H) and 4.15 to 3.85 (m, 0.17H).

COMPARATIVE EXAMPLES

Example 20

Reaction of C$_3$C$_4$-Bromide with Phthalimide (19)

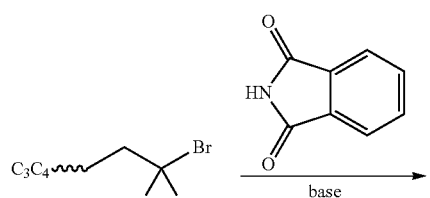

2

-continued

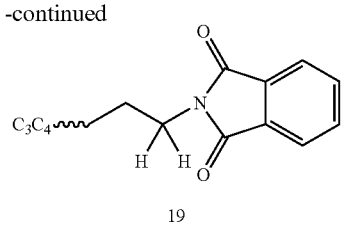

19

A mixture of potassium phthalimide (0.875 g, 4.72 mmol) and bromo-terminated C$_3$C$_4$ macromer 2 (from Example 3, 2.50 g, 2.36 mmol of Br) in N,N-dimethylformamide (9 ml) and tetrahydrofuran (18 ml) was heated at 80° C. (oil bath) for 13 hours under a nitrogen atmosphere. The mixture was cooled to 25° C., filtered and the solvent was removed in vacuo. The residue was dissolved in hexanes, washed with water, brine, dried over MgSO$_4$, filtered and concentrated on a rotary evaporator to give a pale yellow oil product (2.60 g). $^1$H NMR indicated consumption of the primary bromide. Elemental analysis: C, 82.62%; H, 13.23%; N, 1.16%; Br, <0.25%.

Example 21

Reaction of C$_3$C$_4$-Bromide with Potassium Hydroxide (20)

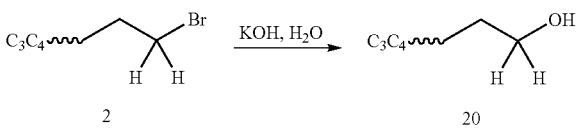

2  20

To a solution of bromo-terminated C$_3$C$_4$ macromer 2 (from Example 3, 3.79 g, 3.58 mmol of Br) in tetrahydrofuran (18 ml) and 1-methyl-2-pyrrolidinone (9 ml) at 25° C. was added a solution of KOH (1.61 g, 28.65 mmol) in water (2 ml). The mixture was heated at 70° C. for 20 hours. The mixture was cooled to 25° C. and the aqueous phase was extracted with hexanes (25 ml). The organic extract was washed with water (2×45 ml), dried over MgSO$_4$, filtered and concentrated on a rotary evaporator to give a light yellow viscous oil as crude product (3.68 g). $^1$H NMR (400 MHz, CDCl$_3$) indicated consumption of the primary bromide. Elemental analyses found C, 77.89%, H, 13.34%.

Example 22

Reaction of C$_3$C$_4$-Bromide with N-Hydroxyphthalimide (21)

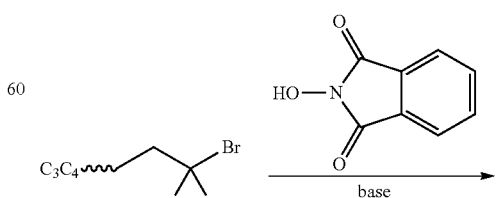

2

-continued

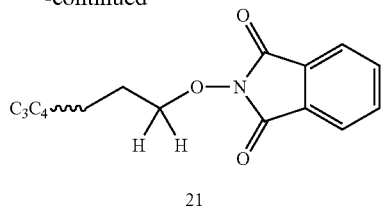

21

A mixture of N-hydroxyphthalimide (0.475 g, 2.91 mmol) and potassium carbonate (0.575 g, 4.16 mmol) in N,N-dimethylformamide (8 ml) was heated to 80° C. for 10 minutes. To this brown mixture was added a solution of bromo-terminated $C_3C_4$ macromer 2 (from Example 3, 2.20 g, 2.08 mmol of Br) in tetrahydrofuran (20 ml) and the resulting mixture was heated at 80° C. (oil bath) for 19 hours under a nitrogen atmosphere. The mixture was cooled to 25° C., filtered and the solvent was removed in vacuo. The residue was dissolved in hexanes, washed with water, brine, dried over $MgSO_4$, filtered and concentrated on a rotary evaporator to give a clear yellow oil product (2.10 g). $^1H$ NMR indicated consumption of the primary bromide. $^1H$ NMR (400 MHz, $CDCl_3$): δ (ppm) 7.85-7.82 (m, 2.0H), 7.75-7.73 (m, 2.0H), 4.19 (—C$\underline{H}_2$—O—N, t, 2.0H), 1.93-1.72 (br, 2.5H), 1.72-1.47 (m, 18.0H), 1.47-1.22 (m, 39.0H), 1.22-0.92 (m, 48.3H), 0.92-0.55 (m, 92.5H).

Example 23

Reaction of $C_3C_6$-Bromide with 4-Fluorophenol (22)

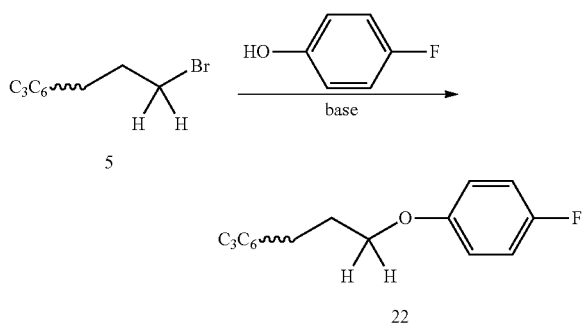

A mixture of 4-fluorophenol (0.434 g, 3.87 mmol), potassium carbonate (0.745 g, 5.39 mmol), potassium iodide (0.056 g, 0.337 mmol) and bromo-terminated $C_3C_6$ macromer 5 (from Example 6, 5.00 g, 3.37 mmol of Br) in tetrahydrofuran (20 ml) and 1-methyl-2-pyrrolidinone (10 ml) was heated at 85° C. to 95° C. (oil bath) overnight under a nitrogen atmosphere. The mixture was cooled to 25° C. and the solvent was removed in vacuo. The residue was dissolved in hexanes, washed with water, brine, dried over $MgSO_4$, filtered and concentrated on a rotary evaporator to give a light yellow viscous oil product (4.88 g). $^1H$ NMR indicated consumption of the primary bromide. $^1H$ NMR (400 MHz, $CDCl_3$): δ (ppm) 6.97-6.93 (m, 2.2H), 6.83-6.80 (m, 2.1H), 3.89 (—C$\underline{H}_2$—O, t, 2.0H), 2.07-1.67 (br, 3.3H), 1.67-1.48 (m, 22.6H), 1.48-1.34 (m, 16.6H), 1.34-1.16 (m, 94.9H), 1.16-0.93 (m, 57.1H), 0.93-0.86 (m, 59.2H), 0.86-0.55 (m, 55.5H). Elemental analysis: C, 84.70%; H, 14.23%; F, 0.68%; Br, trace <0.25%.

Example 24

Reaction of $C_3$—Br with Cyclopentadienyl Lithium (CpLi) (23)

$C_3$—Br (from Example 16, 29.4 g) was dissolved in THF (100 ml) and dried over 3 A sieves for 48 hours. The solution was decanted into a round bottom glass flask with stir bar and 1.3 g (CpLi, Strem) was added. The reaction mixture was refluxed under a $N_2$ atmosphere overnight. The reaction was cooled to ambient temperature and an additional 1.3 g of CpLi was added. The reaction mixture was stirred for 48 hours. An aliquot analyzed by $^1H$ NMR indicated that all $CH_2$—Br groups had been consumed. The reaction mixture was diluted with hexane (90 ml) and washed with $H_2O$ (3×100 ml). The volatiles were removed and the product dried in a vacuum oven at 70° C. for 12 hours. $^1H$ NMR (500 MHz, $CDCl_3$): δ (ppm) 6.3-5.55 (m, 1.0H), 2.8-2.65 (m, 0.8H), 2.65-2.1 (m, 1.9H), 2.0-0.5 (m, 118.2H).

All documents described herein are incorporated by reference herein, including any priority documents and/or testing procedures to the extent they are not inconsistent with this text, provided however that any priority document not named in the initially filed application or filing documents is NOT incorporated by reference herein. As is apparent from the foregoing general description and the specific embodiments, while forms of the invention have been illustrated and described, various modifications can be made without departing from the spirit and scope of the invention. Accordingly, it is not intended that the invention be limited thereby. Likewise, the term "comprising" is considered synonymous with the term "including" for purposes of Australian law. Likewise whenever a composition, an element or a group of elements is preceded with the transitional phrase "comprising", it is understood that we also contemplate the same composition or group of elements with transitional phrases "consisting essentially of," "consisting of", "selected from the group of consisting of," or "is" preceding the recitation of the composition, element, or elements and vice versa. Thus, the term "comprising" encompasses the terms "consisting essentially of," "is," and "consisting of" and anyplace "comprising" is used "consisting essentially of," "is," or consisting of may be substituted therefor.

What is claimed is:

1. A polyolefin composition comprising one or more of the following formulae:

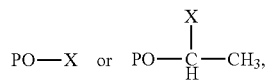

wherein the PO is the residual portion of a vinyl terminated macromonomer (VTM) having had a terminal unsaturated carbon of an allylic chain and a vinyl carbon adjacent to the terminal unsaturated carbon;

X is attached to the terminal portion of the VTM to provide PO—X or at the vinylidene carbon of the VTM to provide PO—CHXCH$_3$; and X is Cl, Br, I, or F; and wherein the $M_w/M_n$ is from 2 to 4.

2. The polyolefin composition of claim 1, wherein the VTM is one or more of:
   (i) a vinyl terminated polymer having at least 5% allyl chain ends relative to total unsaturation;
   (ii) a vinyl terminated polymer having an Mn of at least 160 g/mol (measured by $^1H$ NMR) comprising of one or more C$_4$ to C$_{40}$ higher olefin derived units, where the higher olefin polymer comprises substantially no propylene derived units; and wherein the higher olefin polymer has at least 5% allyl chain ends relative to total unsaturation;

(iii) a copolymer having an Mn of 300 g/mol or more (measured by $^1$H NMR) comprising (a) from about 20 mol % to about 99.9 mol % of at least one C$_5$ to C$_{40}$ higher olefin, and (b) from about 0.1 mol % to about 80 mol % of propylene, wherein the higher olefin copolymer has at least 40% allyl chain ends relative to total unsaturation;

(iv) a copolymer having an Mn of 300 g/mol or more (measured by $^1$H NMR), and comprises (a) from about 80 mol % to about 99.9 mol % of at least one C$_4$ olefin, (b) from about 0.1 mol % to about 20 mol % of propylene; and wherein the vinyl terminated macromonomer has at least 40% allyl chain ends relative to total unsaturation;

(v) a co-oligomer having an Mn of 300 g/mol to 30,000 g/mol (measured by $^1$H NMR) comprising 10 mol % to 90 mol % propylene and 10 mol % to 90 mol % of ethylene, wherein the oligomer has at least X % allyl chain ends relative to total unsaturation, where: 1) X=(-0.94*(mol % ethylene incorporated)+100), when 10 mol % to 60 mol % ethylene is present in the co-oligomer, 2) X=45, when greater than 60 mol % and less than 70 mol % ethylene is present in the co-oligomer, and 3) X=(1.83*(mol % ethylene incorporated)−83), when 70 mol % to 90 mol % ethylene is present in the co-oligomer;

(vi) a propylene oligomer, comprising more than 90 mol % propylene and less than 10 mol % ethylene wherein the oligomer has: at least 93% allyl chain ends, a number average molecular weight (Mn) of about 500 g/mol to about 20,000 g/mol, an isobutyl chain end to allylic vinyl group ratio of 0.8:1 to 1.35:1.0, less than 100 ppm aluminum, and/or less than 250 regio defects per 10,000 monomer units;

(vii) a propylene oligomer, comprising: at least 50 mol % propylene and from 10 mol % to 50 mol % ethylene, wherein the oligomer has: at least 90% allyl chain ends relative to total unsaturation, an Mn of about 150 g/mol to about 20,000 g/mol, and an isobutyl chain end to allylic vinyl group ratio of 0.8:1 to 1.2:1.0, wherein monomers having four or more carbon atoms are present at from 0 mol % to 3 mol %;

(viii) a propylene oligomer, comprising: at least 50 mol % propylene, from 0.1 mol % to 45 mol % ethylene, and from 0.1 mol % to 5 mol % C$_4$ to C$_{12}$ olefin, wherein the oligomer has: at least 90% allyl chain ends relative to total unsaturation, an Mn of about 150 g/mol to about 10,000 g/mol, and an isobutyl chain end to allylic vinyl group ratio of 0.8:1 to 1.35:1.0;

(ix) a propylene oligomer, comprising: at least 50 mol % propylene, from 0.1 mol % to 45 mol % ethylene, and from 0.1 mol % to 5 mol % diene, wherein the oligomer has: at least 90% allyl chain ends relative to total unsaturation, an Mn of about 150 g/mol to about 10,000 g/mol, and an isobutyl chain end to allylic vinyl group ratio of 0.7:1 to 1.35:1.0;

(x) a homo-oligomer, comprising propylene, wherein the oligomer has: at least 93% allyl chain ends relative to total unsaturation, an Mn of about 500 g/mol to about 70,000 g/mol, an isobutyl chain end to allylic vinyl group ratio of 0.8:1 to 1.2:1.0, and less than 1400 ppm aluminum;

(xi) vinyl terminated polyethylene having: (a) at least 60% allyl chain ends relative to total unsaturation; (b) a molecular weight distribution of less than or equal to 4.0; (c) a g'$_{(vis)}$ of greater than 0.95; and (d) an Mn ($^1$H NMR) of at least 20,000 g/mol; and (xii) vinyl terminated polyethylene having: (a) at least 50% allyl chain ends relative to total unsaturation; (b) a molecular weight distribution of less than or equal to 4.0; (c) a g'$_{(vis)}$ of 0.95 or less; (d) an Mn ($^1$H NMR) of at least 7,000 g/mol; and (e) a Mn (GPC)/Mn ($^1$H NMR) in the range of from about 0.8 to about 1.2.

3. A polyolefin composition comprising one or more of the following formulae:

$$\text{PO—Y} \quad \text{or} \quad \text{PO}-\underset{\underset{H}{|}}{\overset{\overset{Y}{|}}{C}}-CH_3,$$

wherein the PO is the residual portion of a vinyl terminated macromonomer (VTM) having had a terminal unsaturated carbon of an allylic chain and a vinyl carbon adjacent to the terminal unsaturated carbon;

Y is a hydroxyl, an ether group, a cyano, a C$_1$-C$_{20}$ alkyl group, a cyclopentadienyl, an aromatic group, or a phthalimide group; and wherein the M$_w$/M$_n$ of composition is from 2 to 4.

4. The polyolefin of claim 3, wherein the VTM is one or more of:

(i) a vinyl terminated polymer having at least 5% allyl chain ends relative to total unsaturation;

(ii) a vinyl terminated polymer having an Mn of at least 160 g/mol (measured by $^1$H NMR) comprising of one or more C$_4$ to C$_{40}$ higher olefin derived units, where the higher olefin polymer comprises substantially no propylene derived units; and wherein the higher olefin polymer has at least 5% allyl chain ends relative to total unsaturation;

(iii) a copolymer having an Mn of 300 g/mol or more (measured by $^1$H NMR) comprising (a) from about 20 mol % to about 99.9 mol % of at least one C$_5$ to C$_{40}$ higher olefin, and (b) from about 0.1 mol % to about 80 mol % of propylene, wherein the higher olefin copolymer has at least 40% allyl chain ends relative to total unsaturation;

(iv) a copolymer having an Mn of 300 g/mol or more (measured by $^1$H NMR), and comprises (a) from about 80 mol % to about 99.9 mol % of at least one C$_4$ olefin, (b) from about 0.1 mol % to about 20 mol % of propylene; and wherein the vinyl terminated macromonomer has at least 40% allyl chain ends relative to total unsaturation;

(v) a co-oligomer having an Mn of 300 g/mol to 30,000 g/mol (measured by $^1$H NMR) comprising 10 mol % to 90 mol % propylene and 10 mol % to 90 mol % of ethylene, wherein the oligomer has at least X % allyl chain ends relative to total unsaturation, where: 1) X=(-0.94*(mol % ethylene incorporated)+100), when 10 mol % to 60 mol % ethylene is present in the co-oligomer, 2) X=45, when greater than 60 mol % and less than 70 mol % ethylene is present in the co-oligomer, and 3) X=(1.83*(mol % ethylene incorporated)−83), when 70 mol % to 90 mol % ethylene is present in the co-oligomer;

(vi) a propylene oligomer, comprising more than 90 mol % propylene and less than 10 mol % ethylene wherein the oligomer has: at least 93% allyl chain ends relative to total unsaturation, a number average molecular weight (Mn) of about 500 g/mol to about 20,000 g/mol, an isobutyl chain end to allylic vinyl group ratio of 0.8:1 to 1.35:1.0, less than 100 ppm aluminum, and/or less than 250 regio defects per 10,000 monomer units;

(vii) a propylene oligomer, comprising: at least 50 mol % propylene and from 10 mol % to 50 mol % ethylene, wherein the oligomer has: at least 90% allyl chain ends relative to total unsaturation, an Mn of about 150 g/mol to about 20,000 g/mol, and an isobutyl chain end to allylic vinyl group ratio of 0.8:1 to 1.2:1.0, wherein monomers having four or more carbon atoms are present at from 0 mol % to 3 mol %;

(viii) a propylene oligomer, comprising: at least 50 mol % propylene, from 0.1 mol % to 45 mol % ethylene, and from 0.1 mol % to 5 mol % $C_4$ to $C_{12}$ olefin, wherein the oligomer has: at least 90% allyl chain ends relative to total unsaturation, an Mn of about 150 g/mol to about 10,000 g/mol, and an isobutyl chain end to allylic vinyl group ratio of 0.8:1 to 1.35:1.0;

(ix) a propylene oligomer, comprising: at least 50 mol % propylene, from 0.1 mol % to 45 mol % ethylene, and from 0.1 mol % to 5 mol % diene, wherein the oligomer has: at least 90% allyl chain ends relative to total unsaturation, an Mn of about 150 g/mol to about 10,000 g/mol, and an isobutyl chain end to allylic vinyl group ratio of 0.7:1 to 1.35:1.0;

(x) a homo-oligomer, comprising propylene, wherein the oligomer has: at least 93% allyl chain ends relative to total unsaturation, an Mn of about 500 g/mol to about 70,000 g/mol, an isobutyl chain end to allylic vinyl group ratio of 0.8:1 to 1.2:1.0, and less than 1400 ppm aluminum;

(xi) vinyl terminated polyethylene having: (a) at least 60% allyl chain ends relative to total unsaturation; (b) a molecular weight distribution of less than or equal to 4.0; (c) a $g'_{(vis)}$ of greater than 0.95; and (d) an Mn ($^1$H NMR) of at least 20,000 g/mol; and (xii) vinyl terminated polyethylene having: (a) at least 50% allyl chain ends relative to total unsaturation; (b) a molecular weight distribution of less than or equal to 4.0; (c) a $g'_{(vis)}$ of 0.95 or less; (d) an Mn ($^1$H NMR) of at least 7,000 g/mol; and (e) a Mn (GPC)/Mn ($^1$H NMR) in the range of from about 0.8 to about 1.2.

5. The polyolefin composition of claim 3, wherein the ether group comprises the formula:

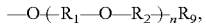
—O—(R$_1$—O—R$_2$)$_n$R$_9$, wherein R$_1$ is an alkyl or an aryl;
R$_2$ is a bond, an alkyl or an aryl;
R$_9$ is an alkyl or an aryl; and
n is from 1 to about 500.

6. The polyolefin composition of claim 3, wherein the ether group comprises the formula:

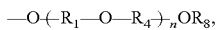
—O—(R$_1$—O—R$_4$)$_n$OR$_8$, wherein each R$_1$ and R$_4$ is, independently, an alkyl or an aryl;
R$_8$ is an alkyl or an aryl; and
n is from 1 to about 500.

7. The polyolefin compositions of claim 1, wherein the composition is amorphous.

8. A method to functionalize a vinyl terminated macromonomer (VTM) comprising the step:

contacting a VTM with a compound having the formula HX, wherein X is Cl, I, Br, or F to provide an X functionalized VTM; and
wherein the $M_w/M_n$ of the X functionalized VTM is from 2 to 4.

9. The method of claim 8, wherein the VTM is one or more of:

(i) a vinyl terminated polymer having at least 5% allyl chain ends relative to total unsaturation;

(ii) a vinyl terminated polymer having an Mn of at least 160 g/mol (measured by $^1$H NMR) comprising of one or more $C_4$ to $C_{40}$ higher olefin derived units, where the higher olefin polymer comprises substantially no propylene derived units; and wherein the higher olefin polymer has at least 5% allyl chain ends relative to total unsaturation;

(iii) a copolymer having an Mn of 300 g/mol or more (measured by $^1$H NMR) comprising (a) from about 20 mol % to about 99.9 mol % of at least one $C_5$ to $C_{40}$ higher olefin, and (b) from about 0.1 mol % to about 80 mol % of propylene, wherein the higher olefin copolymer has at least 40% allyl chain ends relative to total unsaturation;

(iv) a copolymer having an Mn of 300 g/mol or more (measured by $^1$H NMR), and comprises (a) from about 80 mol % to about 99.9 mol % of at least one $C_4$ olefin, (b) from about 0.1 mol % to about 20 mol % of propylene; and wherein the vinyl terminated macromonomer has at least 40% allyl chain ends relative to total unsaturation;

(v) a co-oligomer having an Mn of 300 g/mol to 30,000 g/mol (measured by $^1$H NMR) comprising 10 mol % to 90 mol % propylene and 10 mol % to 90 mol % of ethylene, wherein the oligomer has at least X % allyl chain ends relative to total unsaturation, where: 1) X=(−0.94*(mol % ethylene incorporated)+100), when 10 mol % to 60 mol % ethylene is present in the co-oligomer, 2) X=45, when greater than 60 mol % and less than 70 mol % ethylene is present in the co-oligomer, and 3) X=(1.83*(mol % ethylene incorporated)−83), when 70 mol % to 90 mol % ethylene is present in the co-oligomer;

(vi) a propylene oligomer, comprising more than 90 mol % propylene and less than 10 mol % ethylene wherein the oligomer has: at least 93% allyl chain ends relative to total unsaturation, a number average molecular weight (Mn) of about 500 g/mol to about 20,000 g/mol, an isobutyl chain end to allylic vinyl group ratio of 0.8:1 to 1.35:1.0, less than 100 ppm aluminum, and/or less than 250 regio defects per 10,000 monomer units;

(vii) a propylene oligomer, comprising: at least 50 mol % propylene and from 10 mol % to 50 mol % ethylene, wherein the oligomer has: at least 90% allyl chain ends relative to total unsaturation, an Mn of about 150 g/mol to about 20,000 g/mol, and an isobutyl chain end to allylic vinyl group ratio of 0.8:1 to 1.2:1.0, wherein monomers having four or more carbon atoms are present at from 0 mol % to 3 mol %;

(viii) a propylene oligomer, comprising: at least 50 mol % propylene, from 0.1 mol % to 45 mol % ethylene, and from 0.1 mol % to 5 mol % $C_4$ to $C_{12}$ olefin, wherein the oligomer has: at least 90% allyl chain ends relative to total unsaturation, an Mn of about 150 g/mol to about 10,000 g/mol, and an isobutyl chain end to allylic vinyl group ratio of 0.8:1 to 1.35:1.0;

(ix) a propylene oligomer, comprising: at least 50 mol % propylene, from 0.1 mol % to 45 mol % ethylene, and from 0.1 mol % to 5 mol % diene, wherein the oligomer has: at least 90% allyl chain ends relative to total unsaturation, an Mn of about 150 g/mol to about 10,000 g/mol, and an isobutyl chain end to allylic vinyl group ratio of 0.7:1 to 1.35:1.0;

(x) a homo-oligomer, comprising propylene, wherein the oligomer has: at least 93% allyl chain ends relative to total unsaturation, an Mn of about 500 g/mol to about 70,000 g/mol, an isobutyl chain end to allylic vinyl group ratio of 0.8:1 to 1.2:1.0, and less than 1400 ppm aluminum;

(xi) vinyl terminated polyethylene having: (a) at least 60% allyl chain ends relative to total unsaturation; (b) a molecular weight distribution of less than or equal to 4.0; (c) a g'$_{(vis)}$ of greater than 0.95; and (d) an Mn ($^1$H NMR) of at least 20,000 g/mol; and (xii) vinyl terminated polyethylene having: (a) at least 50% allyl chain ends relative to total unsaturation; (b) a molecular weight distribution of less than or equal to 4.0; (c) a g'$_{(vis)}$ of 0.95 or less; (d) an Mn ($^1$H NMR) of at least 7,000 g/mol; and € a Mn (GPC)/Mn ($^1$H NMR) in the range of from about 0.8 to about 1.2.

10. The method of either of claim 8, further comprising the step of contacting the X functionalized VTM with a hydroxyl, an alkoxide, an aryl anion, a carbanion, a cyano or a phthalimide group.

11. The method of claim 10, wherein the alcohol group for the alkoxide comprises the formula:

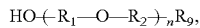

wherein $R_1$ is an alkyl or an aryl;
$R_2$ is a bond, an alkyl or an aryl;
$R_9$ is an alkyl or an aryl; and
n is from 1 to about 500.

12. The method of claim 10, wherein the alcohol group for the alkoxide comprises the formula:

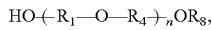

wherein each $R_1$ and $R_4$ is, independently, an alkyl or an aryl;
$R_8$ is, an alkyl or an aryl; and
n is from 1 to about 500.

13. The method of claim 8, wherein the X functionalized VTM is amorphous.

14. The method of claim 8, wherein the method provides a 90% yield.

15. The polyolefin composition of claim 4, wherein the ether group comprises the formula:

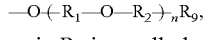

wherein $R_1$ is an alkyl or an aryl;
$R_2$ is a bond, an alkyl or an aryl;
$R_9$ is an alkyl or an aryl; and
n is from 1 to about 500.

16. The polyolefin composition of claim 4, wherein the ether group comprises the formula:

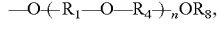

wherein each $R_1$ and $R_4$ is, independently, an alkyl or an aryl;
$R_8$ is an alkyl or an aryl; and
n is from 1 to about 500.

17. The polyolefin compositions of claim 2, wherein the composition is amorphous.

18. The compositions of claim 3, wherein the composition is amorphous.

19. The composition of claim 4, wherein the composition is amorphous.

20. The composition of claim 1, wherein the method provides a 90% yield.

* * * * *